US012784704B2

(12) United States Patent
Yu et al.

(10) Patent No.: US 12,784,704 B2
(45) Date of Patent: Nov. 3, 2026

(54) PANEL DRIVING DEVICE

(71) Applicant: AUO Corporation, Hsinchu City (TW)

(72) Inventors: Chu-Kuan Yu, Hsinchu City (TW); Che-Min Lin, Hsinchu City (TW); Chun-Ru Huang, Hsinchu City (TW); Fang-Ming Tsao, Hsinchu City (TW); Kai-Teng Chiang, Hsinchu City (TW); Chen-Yu Wu, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 168 days.

(21) Appl. No.: 18/932,187

(22) Filed: Oct. 30, 2024

(65) Prior Publication Data

US 2025/0210005 A1 Jun. 26, 2025

(30) Foreign Application Priority Data

Dec. 26, 2023 (TW) ................................ 112150854

(51) Int. Cl.
*G09G 3/36* (2006.01)

(52) U.S. Cl.
CPC ......... *G09G 3/3614* (2013.01); *G09G 3/3688* (2013.01); *G09G 3/3648* (2013.01); *G09G 3/3696* (2013.01); *G09G 2330/023* (2013.01)

(58) Field of Classification Search
CPC .. G09G 3/3614; G09G 3/3688; G09G 3/3648; G09G 2330/023; G09G 3/3696
See application file for complete search history.

(56) References Cited

U.S. PATENT DOCUMENTS

2010/0149158 A1* 6/2010 Lee ........................ G09G 3/344 345/214
2010/0182292 A1 7/2010 Kouno
2014/0240301 A1* 8/2014 Yamakawa .......... G09G 3/3614 345/205
2018/0012556 A1* 1/2018 Hsu ...................... G09G 3/3677
2019/0108781 A1* 4/2019 Iwamoto .............. G09G 3/2003
2020/0302882 A1* 9/2020 Cheng ............... G02F 1/133707

FOREIGN PATENT DOCUMENTS

CN 106448601 A 2/2017
TW 201802793 A 1/2018

* cited by examiner

*Primary Examiner* — William Boddie
*Assistant Examiner* — Saifeldin E Elnafia
(74) *Attorney, Agent, or Firm* — WPAT, PC

(57) ABSTRACT

A panel driving device includes panel. Panel includes data line, reference electrode line and first pixel. Data line transmits data signal. Reference electrode line transmits reference signal. First pixel generates pixel signal according to data signal and reference signal. During positive frame period, difference between first voltage value of pixel signal and first reference voltage value of reference signal is first driving voltage value. During negative frame period, difference between second voltage value of pixel signal and second reference voltage value of reference signal is second driving voltage value. Absolute value of first driving voltage value is about the same as absolute value of second driving voltage value. During charging period which is between negative and positive frame periods, pixel signal has a third voltage value, which is greater than second voltage value, and third voltage value is less than or equal to first voltage value.

17 Claims, 21 Drawing Sheets

PANEL DRIVING DEVICE

CROSS-REFERENCE TO RELATED APPLICATION

This application claims priority to Taiwan Application Serial Number 112150854, filed Dec. 26, 2023, the disclosures of which are incorporated herein by reference in their entireties.

BACKGROUND

Field of Invention

The present disclosure relates to a driving device. More particularly, the present disclosure relates to a panel driving device.

Description of Related Art

Currently, a voltage used by a panel to drive a liquid crystal comes from a voltage difference between a reference voltage (e.g.: common electrode voltage) and a voltage written into the pixel.

With a demand for gaming products, a voltage for driving a liquid crystal is often increased by increasing the voltage written into the pixels. However, a wattage of ta panel also increases significantly.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure provides a panel driving device. The panel driving device includes a panel. The panel includes a data line, a reference electrode line and a first pixel. The data line is configured to transmit data signal. The reference electrode line is configured to transmit a reference signal. The first pixel is configured to receive the data signal and the reference signal. The first pixel is configured to generate a pixel signal according to the data signal and the reference signal. During a positive frame period, a difference between a first voltage value of the pixel signal and a first reference voltage value of the reference signal is a first driving voltage value. During a negative frame period, a difference between a second voltage value of the pixel signal and a second reference voltage value of the reference signal is a second driving voltage value. The negative frame period is located after the positive frame period, and an absolute value of the first driving voltage value is about the same as an absolute value of the second driving voltage value. During a charging period which is between the negative frame period and the positive frame period, the pixel signal includes a third voltage value which is greater than the second voltage value and is less than or equal to the first voltage value.

Another aspect of the present disclosure provides a panel driving device. The panel driving device includes a panel. The panel includes a data line, a plurality of first reference electrode line, a second reference electrode line and a first pixel. The data line is configured to transmit a data signal. The plurality of first reference electrode line is configured to transmit a reference signal. The second reference electrode line is overlapping and coupled to each of first reference electrode lines. The first pixel is configured to receive the data signal and the reference signal. The first pixel is configured to generate a pixel signal according to the data signal and the reference signal. During a positive frame period, a difference between a first voltage value of the pixel signal and a first reference voltage value of the reference signal is a first driving voltage value. During a negative frame period, a difference between a second voltage value of the pixel signal and a second reference voltage value of the reference signal is a second driving voltage value. The negative frame period is located after the positive frame period, and an absolute value of the first driving voltage value is about the same as an absolute value of the second driving voltage value. During a charging period which is between the negative frame period and the positive frame period, the pixel signal comprises a third voltage value which is greater than the second voltage value and is less than or equal to the first voltage value.

Therefore, based on technical contents of the present disclosure, embodiments of the present disclosure panel driving device can achieve an effect of increasing a driving voltage of a liquid crystal by using the two voltage values of the reference signal.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

Figure 1A:
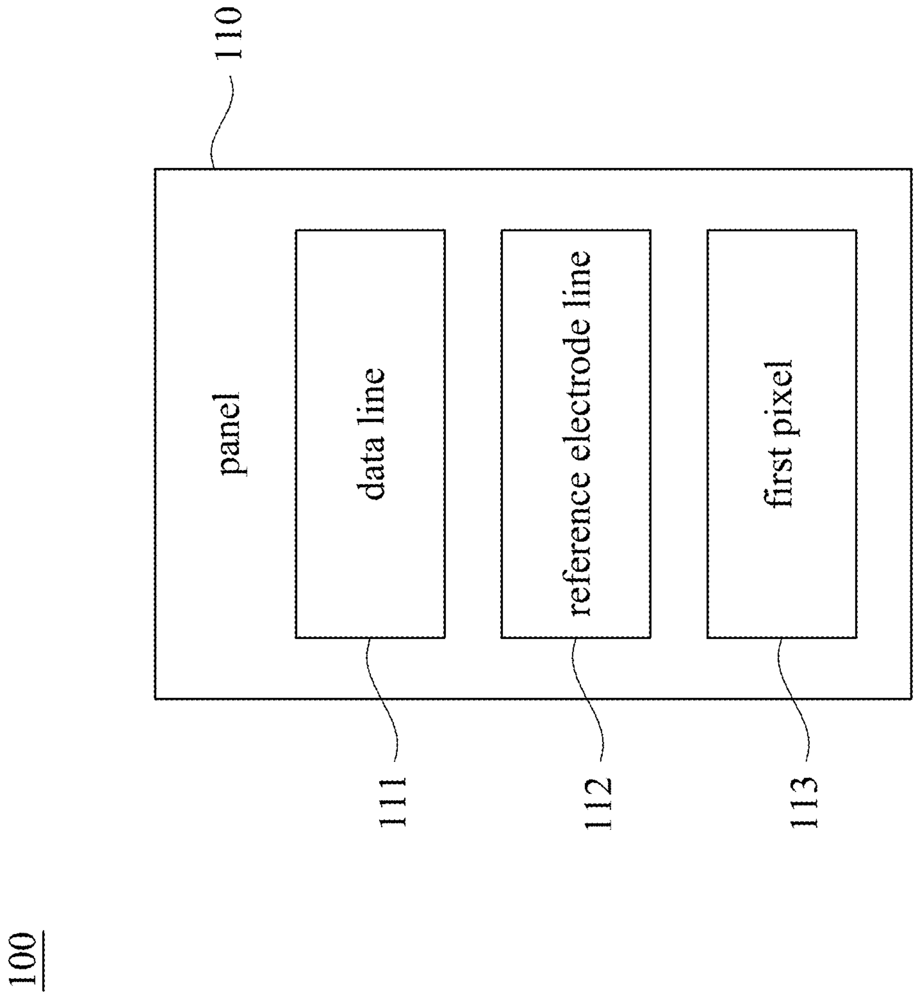
FIG. 1A depicts a schematic diagram of a panel driving device according to one embodiment of the present disclosure.

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1A depicts a schematic diagram of a panel driving device according to one embodiment of the present disclosure. As shown in FIG. 1A, in some embodiments, a panel driving device 100 includes a panel 110. The panel 110 includes a data line 111, a reference electrode line 112 and a first pixel 113. In connection relationship, the data line 111 is coupled to the first pixel 113, and the reference electrode line 112 is coupled to the first pixel 113.

For example, the panel 110 can be any type of light-emitting diode panel, such as a micro light-emitting diode (Micro LED) panel, a sub-millimeter light-emitting diode (Mini LED) panel or an organic light-emitting diode (Organic LED, OLED) panel, but the present disclosure is not limited to this embodiment.

Figure 1B:
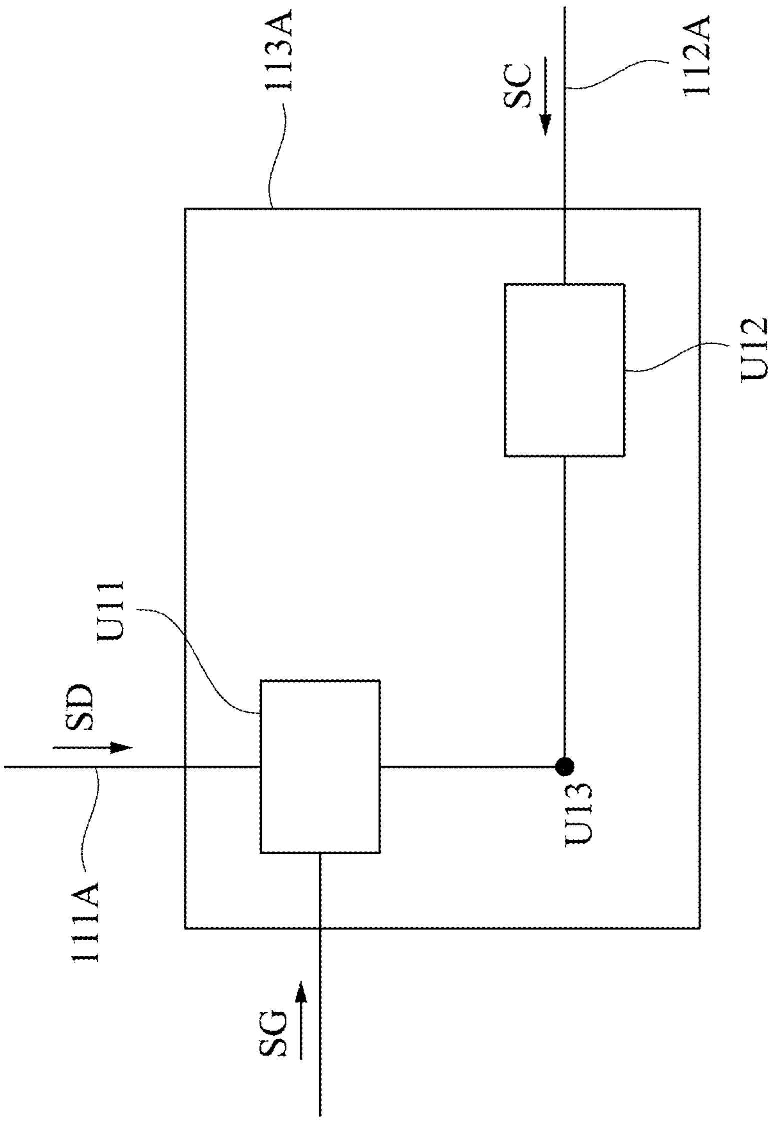
FIG. 1B depicts a schematic diagram of a pixel of a panel driving device according to one embodiment of the present disclosure.

FIG. 1B depicts a schematic diagram of a pixel of a panel driving device according to one embodiment of the present disclosure. As shown in FIG. 1B, in some embodiments, a first pixel 113A includes an element U11, an element U12 and a node U13. In connection relationship, the data line 111A is coupled to the element U11 of the first pixel 113A, the reference electrode line 112A is coupled to the element U12 of the first pixel 113A, and the element U11 and the element U12 are coupled to the node U13.

For example, the element U11 can be a switching element, such as any type of transistor. The element U11 can be configured to output a signal (e.g.: a data signal SD) according to a gate signal SG and the data signal SD. The element U12 can be any type of capacitor, the element U12 can be configured to receive and output a signal (e.g.: a reference signal SC) according to the reference signal SC, and a user can measure a pixel signal at the node U13. However, the present disclosure is not limited to this embodiment.

In some embodiments, the data line 111A is configured to transmit the data signal SD. The reference electrode line 112A is configured to transmit the reference signal SC. The first pixel 113A is configured to receive the data signal SD and the reference signal SC.

For example, the reference electrode line 112A can be a common electrode, the reference signal SC can be a common voltage (Vcom). However, the present disclosure is not limited to this embodiment.

In some embodiments, the first pixel 113A is configured to receive and generate the pixel signal according to the data signal SD and the reference signal SC.

For example, the node U13 of the first pixel 113A can be electrically coupled to form the pixel signal through the data signal SD and the reference signal SC. However, the present disclosure is not limited to this embodiment.

In some embodiments, the data line 111A in FIG. 1B corresponds to the data line 111 in FIG. 1A, the reference electrode line 112A in FIG. 1B corresponds to the reference electrode line 112 in FIG. 1A, and the first pixel 113A in FIG. 1B corresponds to the first pixel 113 in FIG. 1A. However, the present disclosure is not limited to this embodiment.

Figure 2B:
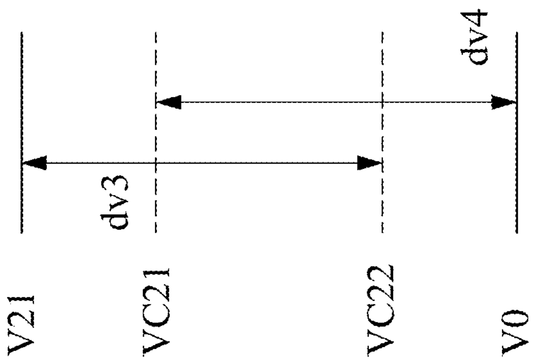
FIG. 2B depicts a usage scenario diagram of a panel driving device according to one embodiment of the present disclosure.
Figure 2A:
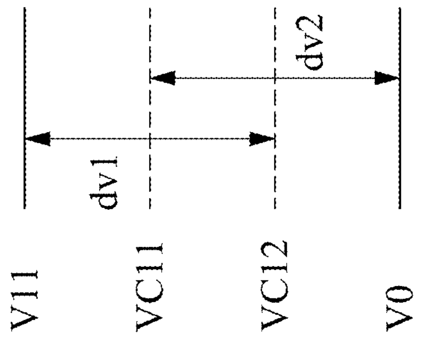
FIG. 2A depicts a usage scenario diagram of a panel driving device according to one embodiment of the present disclosure.

FIG. 2A depicts a usage scenario diagram of a panel driving device according to one embodiment of the present disclosure. As shown in FIG. 2A, in some embodiments, the pixel signal includes a first voltage value V11 and a second voltage value V0, the reference signal includes a first reference voltage value VC11 and a second reference voltage value VC12. A first driving voltage dv1 is between the first voltage value V11 and the second reference voltage value VC12, and a second driving voltage dv2 is between the second voltage value V0 and the first reference voltage value VC11.

For example, the first voltage value V11 can be 7 volts (V), the second voltage value V0 can be 0 volts, the first reference voltage value VC11 can be 5 volts, the second reference voltage value VC12 can be 2 volts, the first driving voltage dv1 can be 5 volts, and the second driving voltage dv2 can be 5 volts. However, the present disclosure is not limited to this embodiment.

In some embodiments, the pixel signal in FIG. 2A corresponds to the pixel signal in FIG. 1B, and the reference signal in FIG. 2A corresponds to the reference signal SC in FIG. 1B. However, the present disclosure is not limited to this embodiment.

In some embodiments, during a positive frame polarity (+Frame) period, the first voltage value V11 can be a voltage value of positive polarity gray scale 255 (+L255), and the second reference voltage value VC12 can be a positive polarity common voltage value (+Vcom).

In some embodiments, during a negative frame polarity (−Frame) period, the second voltage value V0 can be a voltage value of negative polarity gray scale 255 (−L255), and the first reference voltage value VC11 can be a negative polarity common voltage value (−Vcom).

Please refer to FIG. 1A and FIG. 2A together, in some embodiments, in a design of conventional panels, there is only one common voltage value. During the positive frame polarity period, a voltage value of a driving voltage of a liquid crystal (or called liquid crystal driving voltage, Vlc) can be a difference between a voltage value of positive polarity gray scale 255 (+L255) (e.g.: 10 volts) and a common voltage value (e.g.: 5 volts). During the negative frame polarity period, a voltage value of a driving voltage of a liquid crystal can be a difference between a voltage value of negative polarity gray scale 255 (−L255) (e.g.: 0 volts) and the common voltage value (e.g.: 5 volts). Therefore, the aforementioned driving voltage of the liquid crystal can be 5 volts.

However, the panel 110 of the present disclosure can include two common voltage values, for example, the first reference voltage value VC11 and the second reference voltage value VC12. During the positive frame polarity (+Frame) period, the voltage value of positive polarity gray scale 255 (+L255) can be 7 volts, and one of the two common voltage values can be 2 volts. During the negative frame polarity (−Frame) period, the voltage value of negative polarity gray scale 255 (−L255) can be 0 volts, and one of the two common voltage value can be 5 volts. At this time, the driving voltage of the liquid crystal can be 5 volts.

To sum up, the present disclosure can reduce an operating voltage (e.g.: the voltage value of positive polarity gray scale 255) by setting two common voltage values in +Frame and −Frame to achieve a purpose of reducing wattage (Low Power) effect.

FIG. 2B depicts a usage scenario diagram of a panel driving device according to one embodiment of the present disclosure. As shown in FIG. 2B, in some embodiments, the pixel signal includes a first voltage value V21 and a second voltage value V0, and the reference signal includes a first reference voltage value VC21 and a second reference voltage value VC22. A first driving voltage dv3 is between the first voltage value V11 and the second reference voltage value VC12, and a second driving voltage dv4 is between the second voltage value V0 and the first reference voltage value VC11.

For example, the first voltage value V21 can be 10 volts, the second voltage value V0 can be 0 volts, the first reference voltage value VC21 can be 8 volts, the second reference voltage value VC22 can be 2 volts, the first driving voltage dv3 can be 8 volts, and the second driving voltage dv4 can be 8 volts. Furthermore, operations of the pixel signal and the reference signal in FIG. 2B are similar to operations of the pixel signal and the reference signal in FIG. 2A. For the sake of simplicity, descriptions of other operations in FIG. 2B will be omitted here.

Please refer to FIG. 1A and FIG. 2B together, in some embodiments, the voltage value of positive polarity gray scale 255 of the conventional panel can be 10 volts, the common voltage value can be 5 volts, and the driving voltage of the liquid crystal can be 5 volts. However, the voltage value of positive polarity gray scale 255 of the panel 110 of the present disclosure can be 10 volts, and one of the two common voltage values can be 2 volts, and the driving voltage of the liquid crystal can be 8 volts.

To sum up, when the panel of the present disclosure and the conventional panel have the same voltage value of positive polarity gray scale 255, the panel of the present disclosure can have a larger driving voltage of the liquid crystal than the conventional panel, thereby improving the driving voltage of the liquid crystal.

Figure 3:
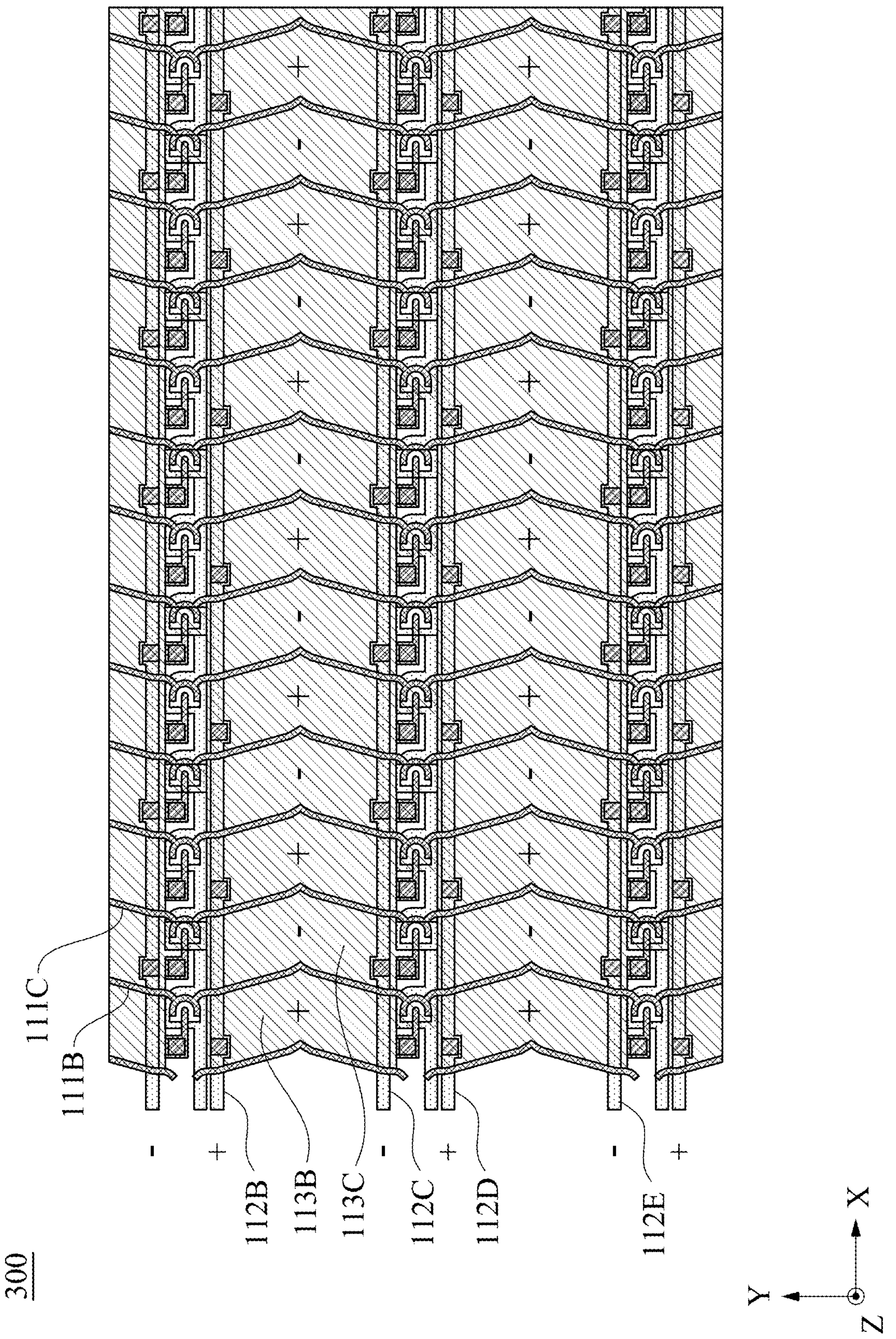
FIG. 3 depicts a schematic structural diagram of a panel driving device according to one embodiment of the present disclosure.

FIG. 3 depicts a schematic structural diagram of a panel driving device according to one embodiment of the present disclosure. As shown in FIG. 3, in some embodiments, the panel 300 includes a plurality of data lines 111B and 111C, a plurality of reference electrode lines 112B, 112C, 112D, and 112E and a plurality of pixels 113B and 113C.

In some embodiments, during the positive frame period, "+" in FIG. 3 can be regarded as positive polarity, and "−" can be regarded as negative polarity. During the negative frame period, the polarities of "+" and "−" in FIG. 3 are reversed, but the present disclosure is not limited to this embodiment.

In some embodiments, the panel 300 in FIG. 3 corresponds to the panel 110 in FIG. 1A, one of the plurality of data lines 111B and 111C in FIG. 3 corresponds to the data line 111 in FIG. 1A, one of the plurality of the reference electrode lines 112B, 112C, 112D, and 112E in FIG. 3 corresponds to the reference electrode line 112 in FIG. 1A, and one of the plurality of pixels 113B and 113C in FIG. 3 corresponds to the pixel 113 in FIG. 1A. However, the present disclosure is not limited to this embodiment.

Figure 4:
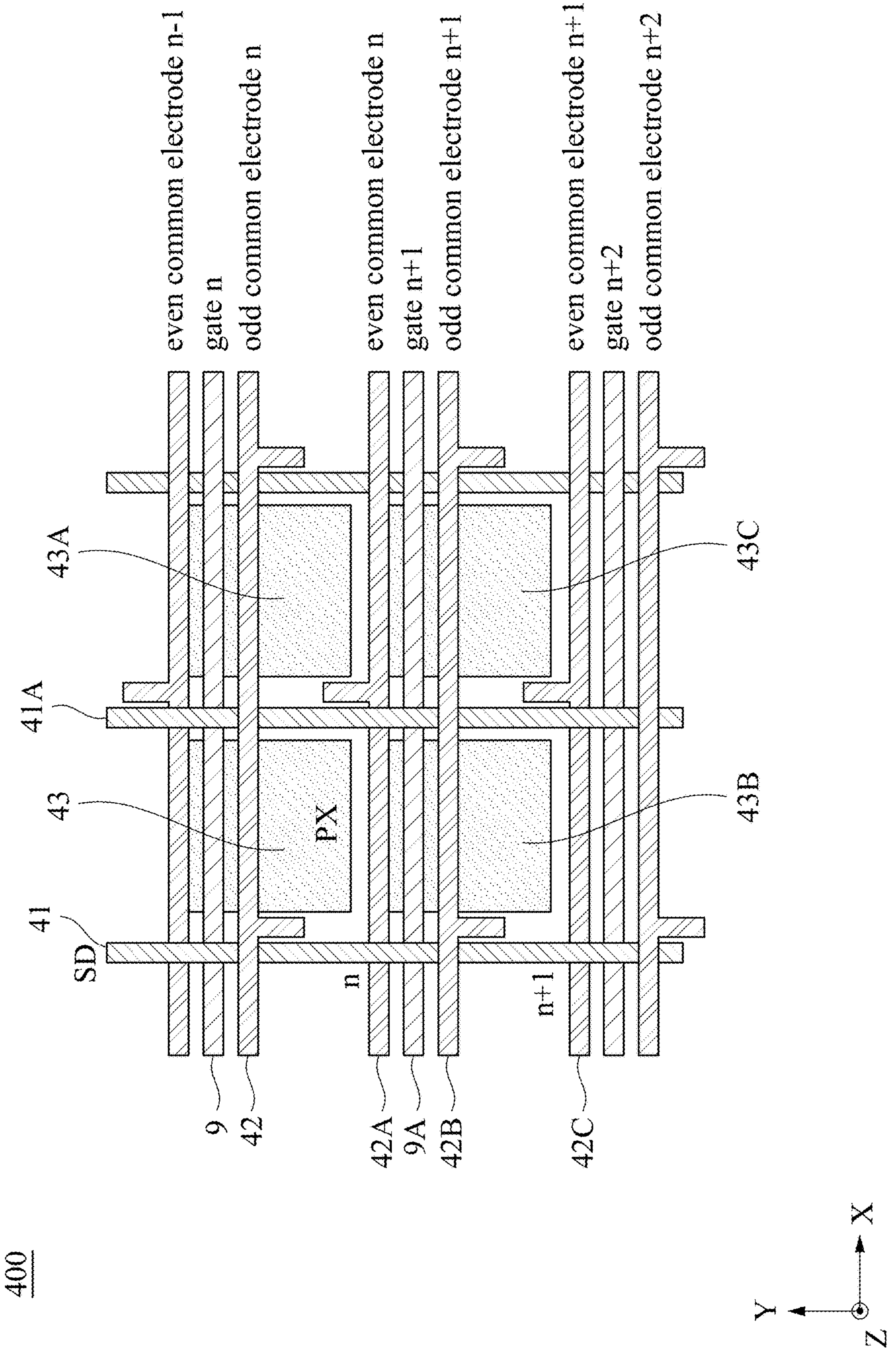
FIG. 4 depicts a schematic structural diagram of a panel driving device according to one embodiment of the present disclosure.

FIG. 4 depicts a schematic structural diagram of a panel driving device according to one embodiment of the present disclosure. As shown in FIG. 4, in some embodiments, the panel 400 includes a plurality of gates 9 and 9A, a plurality of data lines 41 and 41A, a plurality of reference electrode lines 42, 42A, 42B, and 42C and a plurality of pixels 43, 43A, 43B, and 43C.

In some embodiments, the panel 400 in FIG. 4 corresponds to the panel 300 in FIG. 3, but the present disclosure is not limited to this embodiment.

Figure 5A:
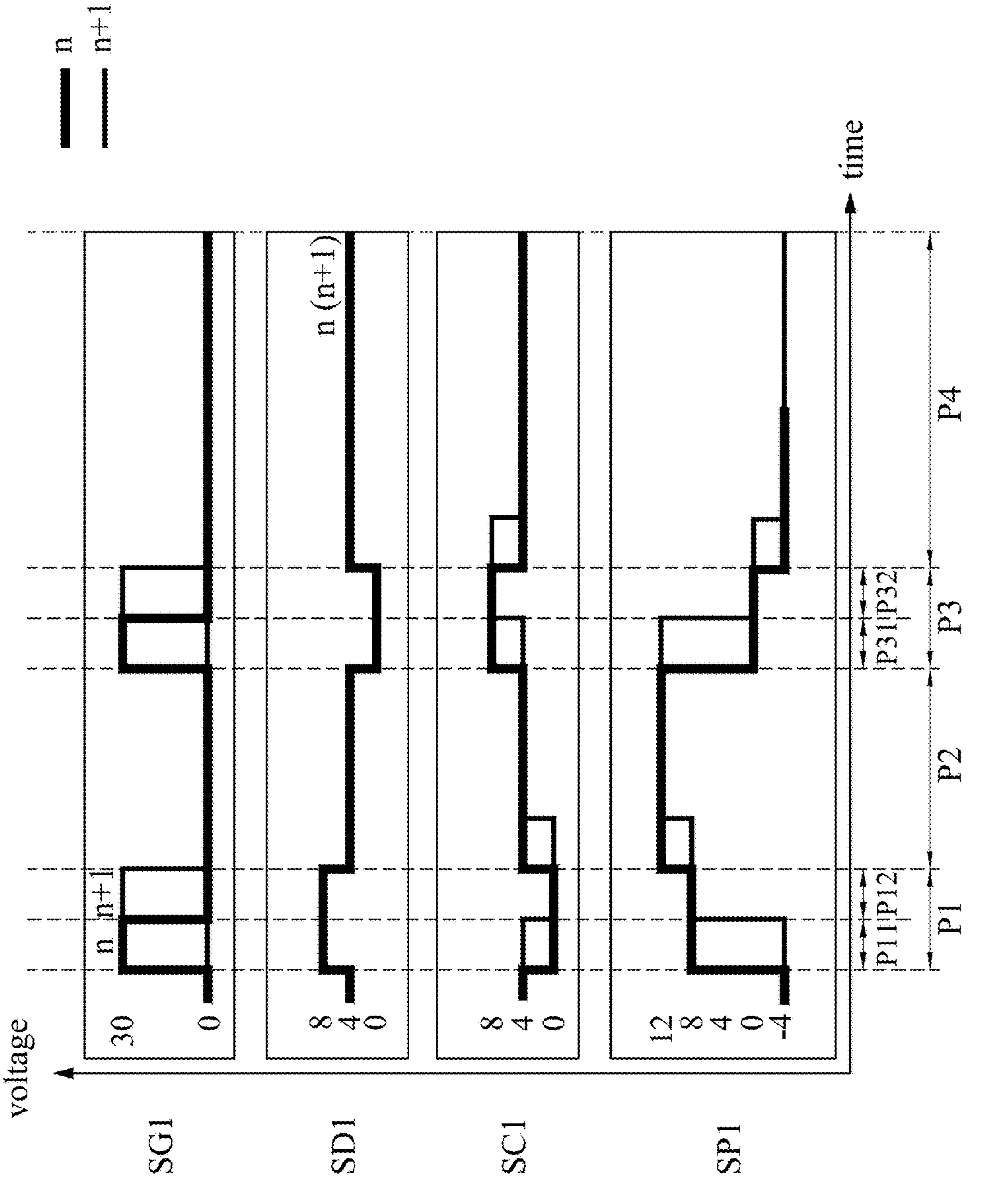
FIG. 5A depicts a timing diagram of a plurality of signals of a panel driving device according to one embodiment of the present disclosure.

FIG. 5A depicts a timing diagram of a plurality of signals of a panel driving device according to one embodiment of the present disclosure. As shown in FIG. 5A, in some embodiments, FIG. 5A includes a gate signal SG1, a data signal SD1, a reference signal SC1 and a pixel signal SP1.

For example, the gate signal SG1 in FIG. 5A corresponds to the gate signal SG in FIG. 1B, the data signal SD1 in FIG. 5A corresponds to the data signal SD in FIG. 1B, the reference signal SC1 in FIG. 5A corresponds to the reference signal SC in FIG. 1B, and the pixel signal SP1 in FIG. 5A corresponds to the pixel signal measured by the node U13 in FIG. 1B. However, the present disclosure is not limited to this embodiment.

In some embodiments, the gate signal SG1 includes a high voltage value and a low voltage value.

For example, the high voltage value of the gate signal SG1 can be 30 volts, and the low voltage value of the gate signal SG1 can be 0 volts. The high voltage value can be configured to conduct the element U11 (as shown in FIG. 1B), and the low voltage value can be configured to turn off the element U11. However, the present disclosure is not limited to this embodiment.

In one embodiment, in operation, during a positive frame period P2, a difference between the first voltage value of the pixel signal SP1 and the first reference voltage value of the reference signal SC1 is a first driving voltage value.

For example, the positive frame period P2 can be a positive frame holding period (+frame holding period), the first voltage value of the pixel signal SP1 can be 12 volts (V), the first reference voltage value of the reference signal SC1 can be 4 volts, and the first driving voltage value can be 12−4=8 volts. However, the present disclosure is not limited to this embodiment.

Then, during a negative frame period P4, a difference between the second voltage value of the pixel signal SP1 and the second reference voltage value of the reference signal SC1 is second driving voltage value.

For example, the negative frame period P4 can be a negative frame holding period (−frame holding period), the second voltage value of the pixel signal SP1 can be −4 volts, the second reference voltage value of the reference signal SC1 can be 4 volts, and the second driving voltage value can be 4−4=8 volts. However, the present disclosure is not limited to this embodiment.

Next, the negative frame period P4 is located after the positive frame period P2, and an absolute value of the first driving voltage value is about the same as an absolute value of the second driving voltage value.

For example, the negative frame period P4 can be any period after the positive frame period P2, the absolute value of the first driving voltage value can be 8 volts, the absolute value of the second driving voltage value can be 8 volts, but the present disclosure is not limited to this embodiment. In some embodiments, a length of the negative frame period P4 can be equal to a length of the positive frame period P2, but the present disclosure is not limited to this embodiment. In some embodiments, a length of the negative frame period P4 can be bigger than a length of the positive frame period P2, but the present disclosure is not limited to this embodiment.

Then, during a charging period P3 which is between the negative frame period P4 and the positive frame period P2, the pixel signal SP1 includes a third voltage value which is greater than the second voltage value and is less than or equal to the first voltage value.

For example, the charging period P3 can be a negative frame charging period (−frame charging period), the pixel 113A can be charged (as shown in FIG. 1B) in the charging period P3, the first voltage value can be 12 volts, the second voltage value can be −4 volts, and the third voltage value can be 0 volts. However, the present disclosure is not limited to this embodiment.

In one embodiment, during an initial period P1 before the positive frame period P2, the pixel signal includes a fourth voltage value which is greater than the third voltage value and is less than or equal to the first voltage value.

For example, the initial period P1 can be a positive frame charging period (+frame charging period), the pixel 113A can be charged (as shown in FIG. 1B) in the initial period P1, the first voltage value can be 12 volts, the third voltage value can be 0 volts, and the fourth voltage value can be 8 volts. However, the present disclosure is not limited to this embodiment.

In one embodiment, during a first period P11, the data signal SD1 includes a first data voltage value, a reference signal SC1 includes a third reference voltage value, an initial voltage value of the pixel signal SP1 is increased to the fourth voltage value according to the first data voltage value. The first data voltage value is greater than the third reference voltage value, and the first period P11 is located before the positive frame period P2.

For example, the first data voltage value of the data signal SD1 can be 8 volts, the third reference voltage value of the reference signal SC1 can be 0 volts, the initial voltage value of the pixel signal SP1 can be −4 volts, and the fourth voltage value of the pixel signal SP1 can be 8 volts. However, the present disclosure is not limited to this embodiment.

In one embodiment, during a second period P12, the data signal SD1 includes a second data voltage value, the reference signal SC1 is maintained at the third reference voltage value, and the pixel signal SP1 is maintained at the fourth voltage value. The second data voltage value is less than or equal to the first data voltage value, and the second period P12 is located after the first period P11.

For example, the second data voltage value of the data signal SD1 can be 8 volts, the third reference voltage value of the reference signal SC1 can be 0 volts, and the fourth voltage value of the pixel signal SP1 can be 8 volt. However, the present disclosure is not limited to this embodiment.

In one embodiment, a range of the first data voltage value of the data signal SD1 can be a specific range, and a range of the second data voltage value of data signal SD1 can be a specific range. In one embodiment, the first data voltage value of the data signal SD1 is equal to the second data voltage value of the data signal SD1. In one embodiment, the first data voltage value of the data signal SD1 can be any value, and the second data voltage value of the data signal SD1 can be any value. However, the present disclosure is not limited to this embodiment.

For example, the first data voltage value of the data signal SD1 can be 4-8 volts, and the second data voltage value of the data signal SD1 can be 4-8 volts. However, the present disclosure is not limited to this embodiment.

In one embodiment, during a third period P31, the data signal SD1 includes a third data voltage value, the reference signal SC1 includes a fourth reference voltage value, the first voltage value of the pixel signal SP1 is reduced to a fifth voltage value according to the third data voltage value. The third data voltage value is less than or equal to the second data voltage value, the fourth reference voltage value is greater than the first reference voltage value, and the third period P31 is located after the positive frame period P2.

For example, the third data voltage value of the data signal SD1 can be 0 volts, the fourth reference voltage value of the reference signal SC1 can be 8 volts, the first voltage value of the pixel signal SP1 can be 12 volts, and the fifth voltage value of the pixel signal SP1 can be 0 volts. However, the present disclosure is not limited to this embodiment.

In one embodiment, during a fourth period P32, the data signal SD1 includes a fourth data voltage value, the reference signal SC1 is maintained at the fourth reference voltage value, and the pixel signal SP1 is maintained at the fifth voltage value. The fourth data voltage value is less than or equal to the third data voltage value, and the fourth period P32 is located after the third period P31.

For example, the fourth data voltage value of the data signal SD1 can be 0 volts, the fourth reference voltage value of the reference signal SC1 can be 8 volts, and the fifth voltage value of the pixel signal SP1 can be 0 volts. However, the present disclosure is not limited to this embodiment.

In one embodiment, a range of the third data voltage value of the data signal SD1 can be a specific range, and a range of the fourth data voltage value of the data signal SD1 can be a specific range. In one embodiment, the third data voltage value of the data signal SD1 is equal to the fourth data voltage value of the data signal SD1. In one embodiment, the third data voltage value of the data signal SD1 can be any value, and the fourth data voltage value of the data signal SD1 can be any value. However, the present disclosure is not limited to this embodiment.

For example, the third data voltage value of the data signal SD1 can be 0-4 volts, and the fourth data voltage value of the data signal SD1 can be 0-4 volts. However, the present disclosure is not limited to this embodiment.

In some embodiments, the gate signal SG1 can include n-level gate signal and n+1-level gate signal, the data signal SD1 can include n-level data signal and n+1-level data signal, the reference signal SC1 can include n-level reference signal and n+1-level reference signal, and the pixel signal SP1 can include n-level pixel signal and n+1-level pixel signal. However, the present disclosure is not limited to this embodiment.

For example, the n-level signals and the n+1-level signals in FIG. 5A are similar in operation, and a difference is only in timing and signal size. However, the present disclosure is not limited to this embodiment.

In some embodiments, the n-level data signal of the data signal SD1 is the same as the n+1-level data signal of the data signal SD1, but the present disclosure is not limited to this embodiment.

In some embodiments, the first driving voltage value in FIG. 5A can correspond to the voltage value of the first driving voltage dv1 in FIG. 2A, and the second driving voltage value in FIG. 5A can correspond to the voltage value of the second driving voltage dv2 in FIG. 2A. However, the present disclosure is not limited to this embodiment. In some embodiments, the first driving voltage value in FIG. 5A can correspond to the voltage value of the first driving voltage dv3 in FIG. 2B, and the second driving voltage value in FIG. 5A can correspond to the voltage value of the second driving voltage dv4 in FIG. 2B. However, the present disclosure is not limited to this embodiment.

Please refer to FIG. 3 and FIG. 5A together, the data line 111B is configured to transmit the data signal SD1 to the pixel 113B, the reference electrode line 112B is configured to transmit the reference signal SC1 to the pixel 113B, and the pixel 113B can include the spixel signal SP1. However, the present disclosure is not limited to this embodiment.

In some embodiments, a time point when the voltage value of the reference signal SC1 drops from 4 volts to 0 volts can be from a beginning of the positive frame (+frame) to before the charging of the pixel 113B is completed (generally recommended before the gate is conducted). At this time, it can be regarded as the reference electrode line (or common electrode, Com) switching to the reference voltage with the positive polarity (Vcom+). However, the present disclosure is not limited to this embodiment.

In some embodiments, a time point when the voltage value of the reference signal SC1 rises from 0 volts to 4 volts can be after the pixel 113B is charged. At this time, it can be regarded as the reference electrode line (or called common electrode, Com) switching to a stable reference voltage (Vcom-stable). However, the present disclosure is not limited to this embodiment.

In some embodiments, a time point when the voltage value of the reference signal SC1 rises from 4 volts to 8 volts can be a beginning of the negative frame (−frame) to before the charging of the pixel 113B is completed (generally recommended before the gate is conducted). At this time, it can be regarded as the reference electrode line (or called common electrode, Com) switching to the reference voltage with negative polarity (Vcom−). However, the present disclosure is not limited to this embodiment.

In some embodiments, a time point when the voltage value of the reference signal SC1 drops from 8 volts to 4 volts can be after the pixel 113B is charged. At this time, it can be regarded as reference electrode line (or common electrode, Com) switching to a stable reference voltage (Vcom-stable). However, the present disclosure is not limited to this embodiment.

In some embodiments, the voltage value of the pixel signal SP1 rising from −4 volts to 8 volts means that after the gate is conducted, the pixel 113B is charged by the data signal SD1. However, the present disclosure is not limited to this embodiment.

In some embodiments, the voltage value of the pixel signal SP1 maintaining at 8 volts means that after the gata is turned off, the pixel 113B is configured to maintain the pixel signal SP1 (or called holding). However, the present disclosure is not limited to this embodiment.

In some embodiments, the voltage value of the pixel signal SP1 rising from 8 volts to 12 volts means that after the reference electrode line (or called common electrode, Com) is switching to the stable reference voltage (Vcom-stable), a result of the pixel signal SP1 being coupled by the reference voltage. However, the present disclosure is not limited to this embodiment.

Figure 5B:
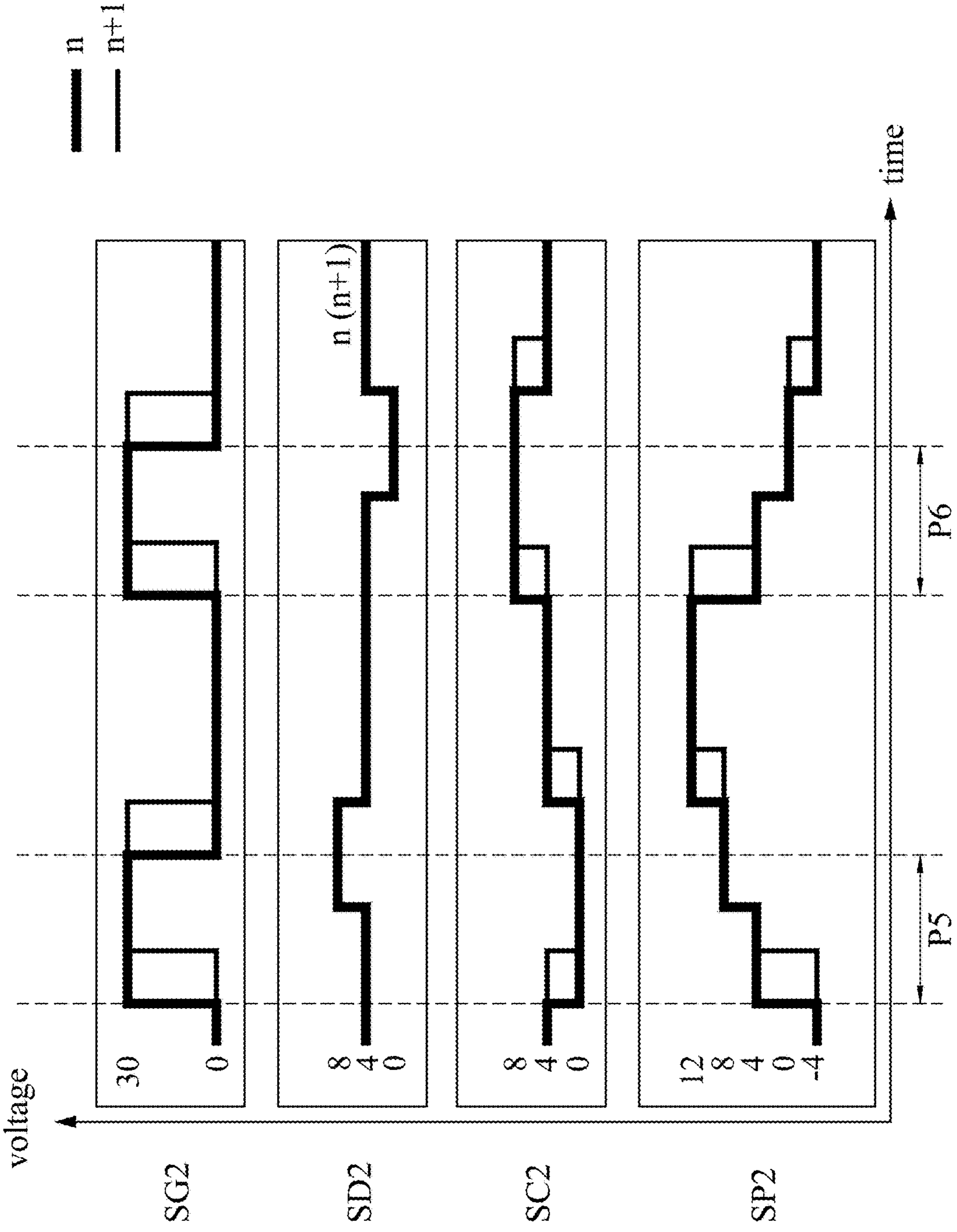
FIG. 5B depicts a timing diagram of a plurality of signals of a panel driving device according to one embodiment of the present disclosure.

FIG. 5B depicts a timing diagram of a plurality of signals of a panel driving device according to one embodiment of the present disclosure. As shown in FIG. 5B, in some embodiments, FIG. 5B includes a gate signal SG2, a data signal SD2, a reference signal SC2 and a pixel signal SP2.

In some embodiments, operations of FIG. 5B are similar to operations of FIG. 5A. For the sake of simplicity, descriptions will be omitted here. It should be noted that a timing and/or a voltage value of the data signal SD2, the reference signal SC2 and/or the pixel signal SP2 in FIG. 5B can be adjusted according to user needs. However, the present disclosure is not limited to this embodiment.

In some embodiments, FIG. 5B can be another implementation of FIG. 5A. FIG. 5A can be a normal driving, and FIG. 5B can be a pre-charging driving. However, the present disclosure is not limited to this embodiment.

In some embodiments, the gate signal SG2 includes two pulse signals, and the two pulse signals include two pulse times P5 and P6.

For example, the pulse time P5 can be approximately equal to the pulse time P6, the pulse time P5 can be greater than a pulse time P11 of the gate signal SG1 in FIG. 5A, and the pulse time P6 can be greater than a pulse time P31 of the gate signal SG1 in FIG. 5A. However, the present disclosure is not limited to this embodiment.

Figure 6A:
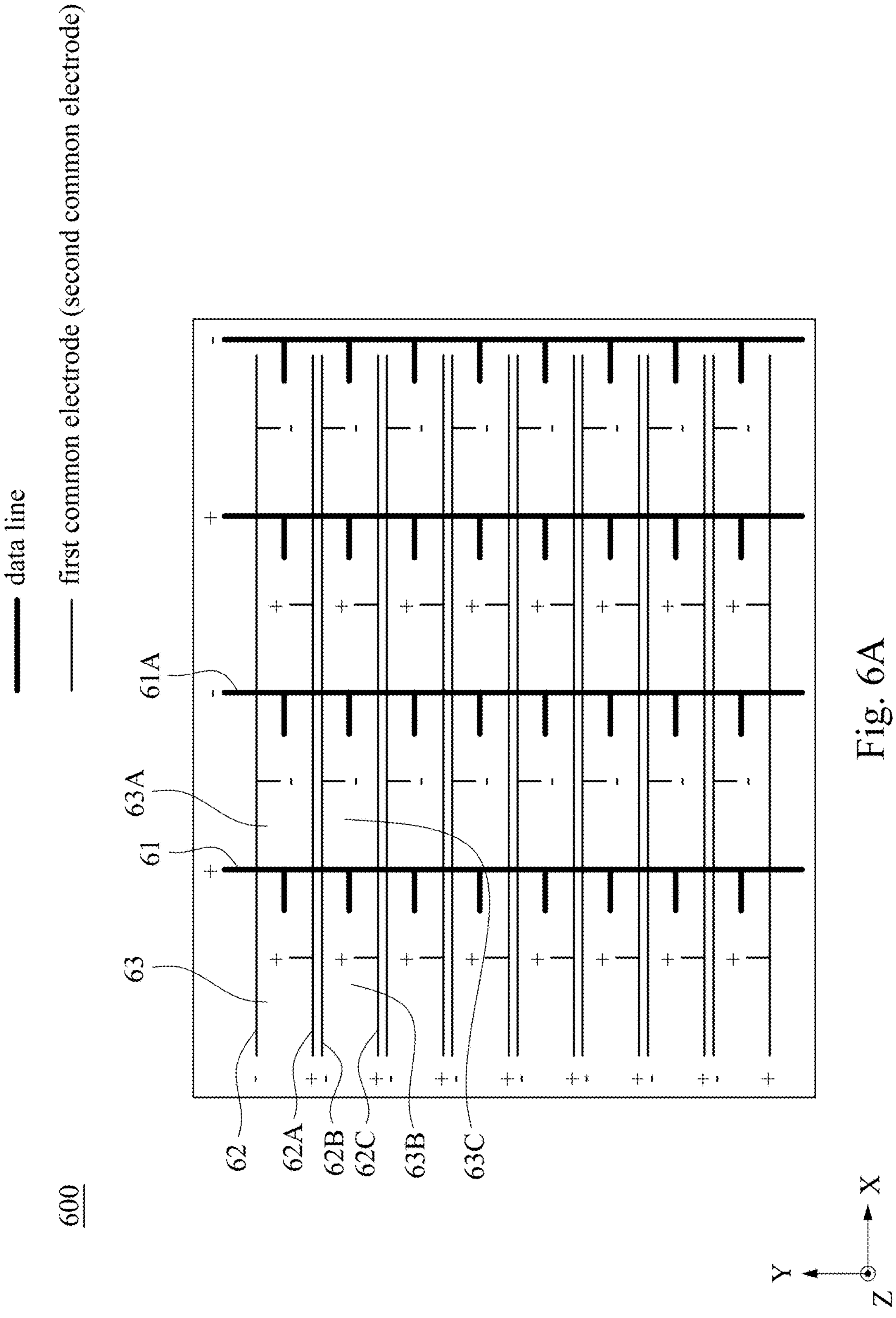
FIG. 6A depicts a usage scenario diagram of a panel driving device according to one embodiment of the present disclosure.

FIG. 6A depicts a usage scenario diagram of a panel driving device according to one embodiment of the present disclosure. As shown in FIG. 6A, in some embodiments, the panel 600 includes a plurality of data lines 61 and 61A, a plurality of reference electrode lines 62, 62A, 62B, and 62C and a plurality of pixels 63, 63A, 63B, and 63C.

In connection relationship, the data line 61 is coupled to the pixel 63, the data line 61 is coupled to the pixel 63B, the data line 61A is coupled to the pixel 63A, the data line 61A is coupled to the pixel 63C, the reference electrode line 62 is coupled to the pixel 63A, the reference electrode line 62A is coupled to the pixel 63, the reference electrode line 62B is coupled to the pixel 63C, and the reference electrode line 62C is coupled to the pixel 63B.

For example, the data line 61 can be configured to transmit a data signal with the first polarity, the data line 61A can be configured to transmit a data signal with the second polarity, the reference electrode line 62 can be configured to transmit a reference signal with the second polarity, the reference electrode line 62A can be configured to transmit a reference signal with the first polarity, the reference electrode line 62B can be configured to transmit a reference signal with the second polarity, and the reference electrode line 62C can be configured to transmit a reference signal with the first polarity. The first polarity and the second polarity can be different polarities, for example, the first polarity can be positive polarity (+), and the second polarity can be negative polarity (−). However, the present disclosure is not limited to this embodiment.

In some embodiments, the reference electrode line 62 can be a first common electrode or a second common electrode, the reference electrode line 62A can be a first common electrode or a second common electrode, the reference electrode line 62B can be a first common electrode or a second common electrode, the reference electrode line 62C can be a first common electrode or a second common electrode. However, the present disclosure is not limited to this embodiment.

For example, the first common electrode can be a metal common electrode (metal com), and the second common electrode can be an Indium tin oxide common electrode (ITO com). However, the present disclosure is not limited to this embodiment.

In one embodiment, the second pixel 63A along a first direction is disposed on one side of the first pixel 63. The third pixel 63B along a second direction is disposed on another side of the first pixel 63. The fourth pixel 63C along the first direction is disposed on side of the third pixel 63B, and the fourth pixel 63C is located on one side of the second pixel 63A.

For example, the first direction can be X-axis direction, and the second direction can be Y-axis direction. However, the present disclosure is not limited to this embodiment.

In one embodiment, in operation, during the positive frame period, the first pixel 63 includes the first polarity, the second pixel 63A includes the second polarity, the third pixel 63B includes the first polarity, and the fourth pixel 63C includes the second polarity.

Then, during the negative frame period, the first pixel 63 includes the second polarity, the second pixel 63A includes the first polarity, the third pixel 63B includes the second polarity, and the fourth pixel 63C includes the first polarity.

Furthermore, the first polarity and the second polarity are different from each other, and the first polarity is related to the reference signal.

For example, the positive frame period in FIG. 6A can correspond to the positive frame period P2 in FIG. 5A, the negative frame period in FIG. 6A can correspond to the negative frame period P4 in FIG. 5A, the first polarity can be positive polarity, and the second polarity can be negative polarity. However, the present disclosure is not limited to this embodiment.

It should be noted that the positive polarity and the negative polarity here can represent a relative magnitude of a physical quantity, for example, the positive polarity and the negative polarity can both be the polarity of the positive voltage, and the voltage value of the positive polarity signal can be greater than the voltage value of the negative polarity. At this time, the aforementioned two voltage values can both be positive values, and the first polarity of the first pixel 63 can come from the first polarity of the data signal transmitted by the data line 61. However, the present disclosure is not limited to this embodiment.

In one embodiment, the data line 61 is coupled to the third pixel 63B.

In some embodiments, the panel 600 in FIG. 6A can correspond to the panel 300 in FIG. 3, but the present disclosure is not limited to this embodiment.

Figure 6B:
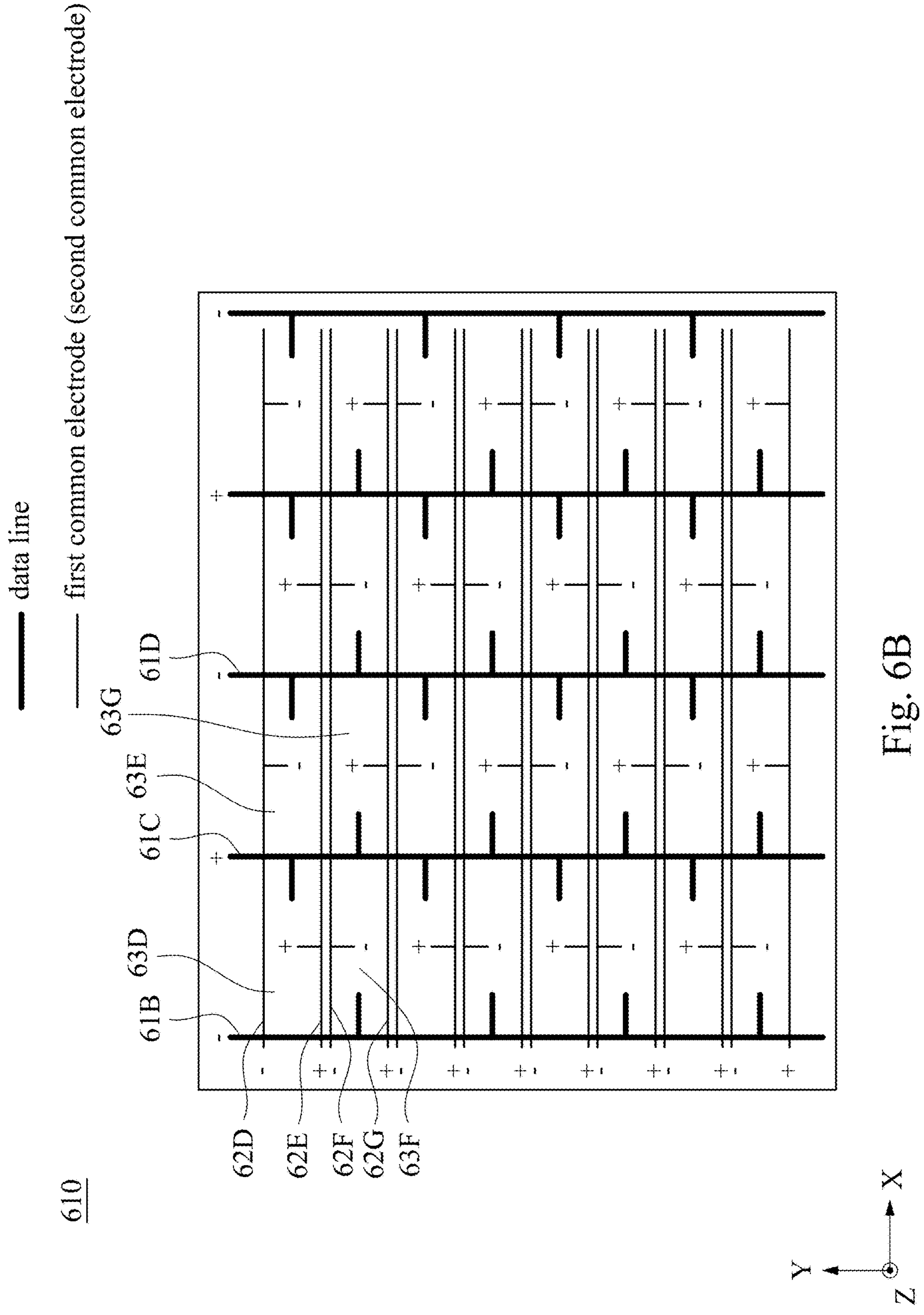
FIG. 6B depicts a usage scenario diagram of a panel driving device according to one embodiment of the present disclosure.

FIG. 6B depicts a usage scenario diagram of a panel driving device according to one embodiment of the present disclosure. As shown in FIG. 6B, in some embodiments, the panel 610 includes a plurality of data lines 61B, 61C and 61D, a plurality of reference electrode lines 62D, 62E, 62F and 62G and a plurality of pixels 63D, 63E, 63F and 63G.

In connection relationship, the data line 61B is coupled to the pixel 63F, the data line 61C is coupled to the pixel 63D, the data line 61C is coupled to the pixel 63G, the data line 61D is coupled to the pixel 63E, the reference electrode line 62D is coupled to the pixel 63E, the reference electrode line 62E is coupled to the pixel 63D, the reference electrode line 62F is coupled to the pixel 63F, and the reference electrode line 62G is coupled to the pixel 63G.

For example, the data line 61B can be configured to transmit a data signal with the second polarity, the data line 61C can be configured to transmit a data signal with the first polarity, the data line 61D can be configured to transmit a data signal with the second polarity, the reference electrode line 62D can be configured to transmit a reference signal with the second polarity, the reference electrode line 62E can be configured to transmit a reference signal with the first polarity, the reference electrode line 62F can be configured to transmit a reference signal with the second polarity, and the reference electrode line 62G can be configured to transmit a reference signal with the second polarity. The first polarity and the second polarity are different polarities, for example, the first polarity can be positive polarity, and the second polarity can be negative polarity. However, the present disclosure is not limited to this embodiment.

In some embodiments, the reference electrode line 62D can be the first common electrode or the second common electrode, the reference electrode line 62E can be the first common electrode or the second common electrode, the reference electrode line 62F can be the first common electrode or the second common electrode, and the reference electrode line 62G can be the first common electrode or the second common electrode. However, the present disclosure is not limited to this embodiment.

In one embodiment, the second pixel 63E along the first direction is disposed on one side of the first pixel 63D. The third pixel 63F along the second direction is disposed on another side of the first pixel 63D. The fourth pixel 63G along the first direction is disposed on one side of the third pixel 63F, and the fourth pixel 63G is located on one side of the second pixel 63E.

For example, the first direction can be X-axis direction, and the second direction can be Y-axis direction. However, the present disclosure is not limited to this embodiment.

In one embodiment, in operation, during the positive frame period, the first pixel 63D includes the first polarity, the second pixel 63E includes the second polarity, the third pixel 63F includes the second polarity, and the fourth pixel 63G includes the first polarity.

Then, during the negative frame period, the first pixel 63D includes the second polarity, the second pixel 63E includes the first polarity, the third pixel 63F includes the first polarity, and the fourth pixel 63G includes the second polarity.

Furthermore, the first polarity and the second polarity are different from each other, and the first polarity is related to the reference signal.

For example, the positive frame period in FIG. 6B can correspond to the positive frame period P2 in FIG. 5A, the negative frame period in FIG. 6B can correspond to the negative frame period P4 in FIG. 5A, the first polarity can be the positive polarity, the second polarity can be the negative polarity, and the first polarity of the first pixel 63D can come from the first polarity of the data signal transmitted by the data line 61C. However, the present disclosure is not limited to this embodiment.

In one embodiment, the data line 61C is coupled to the fourth pixel 63G.

In some embodiments, the panel 610 in FIG. 6B can correspond to the panel 300 in FIG. 3, but the present disclosure is not limited to this embodiment.

Figure 6C:
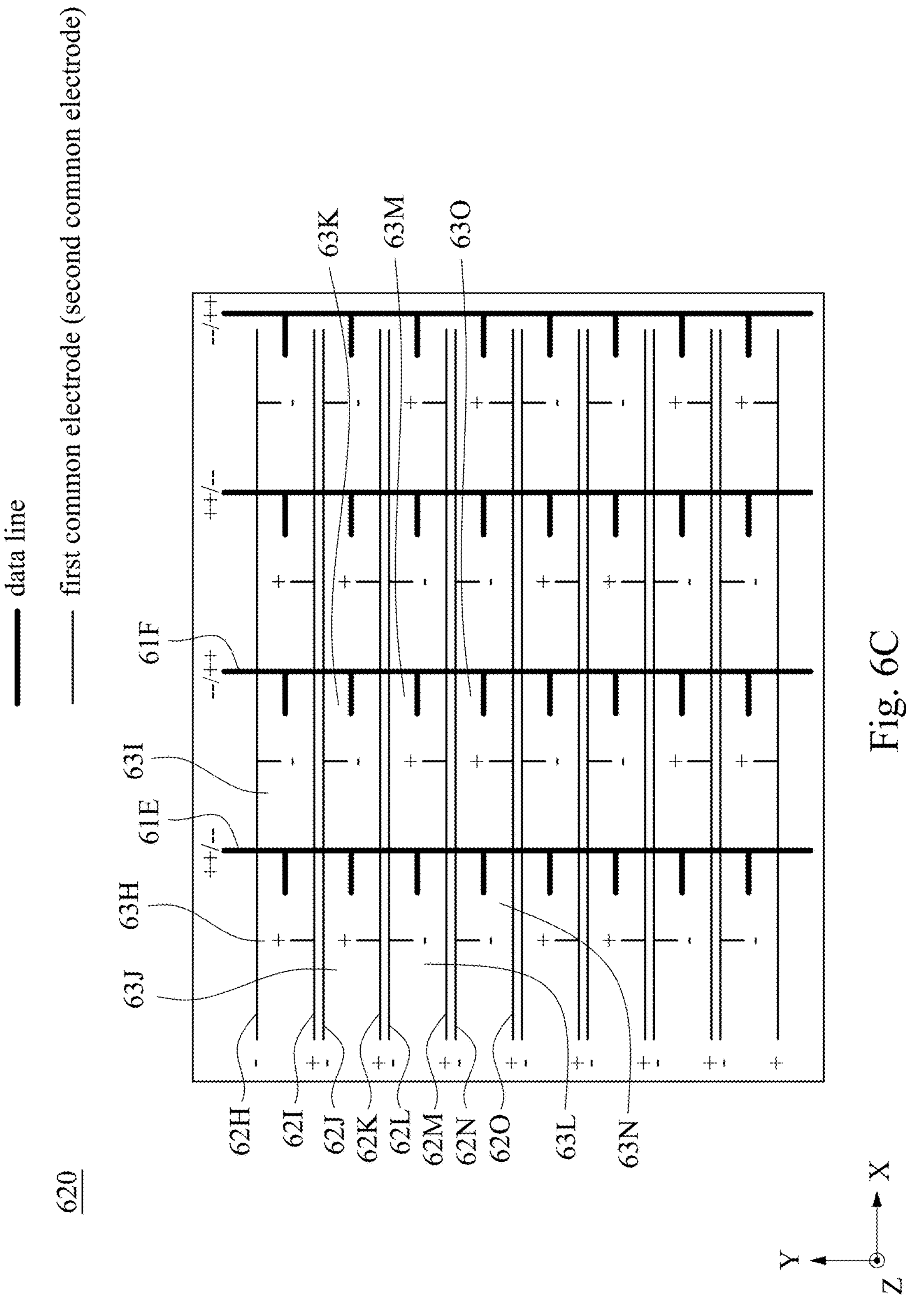
FIG. 6C depicts a usage scenario diagram of a panel driving device according to one embodiment of the present disclosure.

FIG. 6C depicts a usage scenario diagram of a panel driving device according to one embodiment of the present disclosure. As shown in FIG. 6C, in some embodiments, the panel 620 includes a plurality of data lines 61E and 61F, a plurality of reference electrode lines 62H-62O and a plurality of pixels 63H-62O.

In connection relationship, the data line 61E is coupled to the pixels 63H, 63J, 63L and 63N, the data line 61F is coupled to the pixels pixel 63I, 63K, 63M and 63O, the reference electrode line 62H is coupled to the pixel 63I, the reference electrode line 62I is coupled to the pixel 63H, the reference electrode line 62J is coupled to the pixel 63K, the reference electrode line 62K is coupled to the pixel 63J, the reference electrode line 62L is coupled to the pixel 63L, the reference electrode line 62M is coupled to the pixel 63M, the reference electrode line 62N is coupled to the pixel 63N, and the reference electrode line 62O is coupled to the pixel 63O.

For example, the data line 61E can be configured to transmit a data signal with a plurality of polarities (e.g.: ++/−−), the data line 61F can be configured to transmit a data signal with a plurality of polarities (e.g.: −−/++), the reference electrode line 62H can be configured to transmit a reference signal with the second polarity, the reference electrode line 62I can be configured to transmit a reference signal with the first polarity, the reference electrode line 62J can be configured to transmit a reference signal with the second polarity, the reference electrode line 62K can be configured to transmit a reference signal with the first polarity, the reference electrode line 62L can be configured to transmit a reference signal with the second polarity, the reference electrode line 62M can be configured to transmit a reference signal with the first polarity, the reference electrode line 62N can be configured to transmit a reference signal with the second polarity, and the reference electrode line 62O can be configured to transmit a reference signal with the first polarity. The first polarity and the second polarity are different polarities, for example, the first polarity can be positive polarity, and the second polarity can be negative polarity. However, the present disclosure is not limited to this embodiment.

In some embodiments, each of the reference electrode lines 62H-62O can be the first common electrode or the second common electrode, but the present disclosure is not limited to this embodiment.

In one embodiment, the second pixel 63I along the first direction is disposed on one side of the first pixel 63H. The third pixel 63J along the second direction is disposed on another side of the first pixel 63H. The fourth pixel 63K along the first direction is disposed on one side of the third pixel 63J, and the fourth pixel 63K is located on one side of the second pixel 63I.

In one embodiment, in operation, during the positive frame period, the first pixel 63H includes the first polarity, the second pixel 63I includes the second polarity, the third pixel 63J includes the first polarity, and the fourth pixel 63K includes the second polarity.

Then, during the negative frame period, the first pixel 63H includes the second polarity, the second pixel 63I includes the first polarity, the third pixel 63J includes the second polarity, and the fourth pixel 63K includes the first polarity. The first polarity and the second polarity are different from each other, and the first polarity is related to the reference signal.

For example, the positive frame period in FIG. 6C can correspond to the positive frame period P2 in FIG. 5A, the negative frame period in FIG. 6C can correspond to the negative frame period P4 in FIG. 5A, the first polarity can be the positive polarity, the second polarity can be the negative polarity, and the first polarity of the first pixel 63H can come from the first polarity of the data signal transmitted by the data line 61E, but the present disclosure is not limited to this embodiment.

In one embodiment, the fifth pixel 63L along the second direction is disposed on another side of the third pixel 63J. The sixth pixel 63M along the first direction is disposed on one side of the fifth pixel 63L. The seventh pixel 63N along the second direction is disposed on another side of the fifth pixel 63L. The eighth pixel 63O along the first direction is disposed on one side of the seventh pixel 63N, and the eighth pixel 63O is located on one side of the sixth pixel 63M.

In one embodiment, in operation, during the positive frame period, the fifth pixel 63L includes the second polarity, the sixth pixel 63M includes the first polarity, the seventh pixel 63N includes the second polarity, and the eighth pixel 63O includes the first polarity.

Then, during the negative frame period, the fifth pixel 63L includes the first polarity, the sixth pixel includes the second polarity, the seventh pixel includes the first polarity, and the eighth pixel includes the second polarity.

In one embodiment, the second polarity is related to the data signal.

For example, the data signal transmitted by the data line 61E can include the first polarity and the second polarity, and the first polarity and the second polarity can be arranged arbitrarily according to the user's needs or timing. However, the present disclosure is not limited to this embodiment.

In one embodiment, the data line 61E is coupled to the third pixel 63J, the fifth pixel 63L and the seventh pixel 63N.

In some embodiments, the panel 620 in FIG. 6C can correspond to the panel 300 in FIG. 3, but the present disclosure is not limited to this embodiment.

Figure 6D:
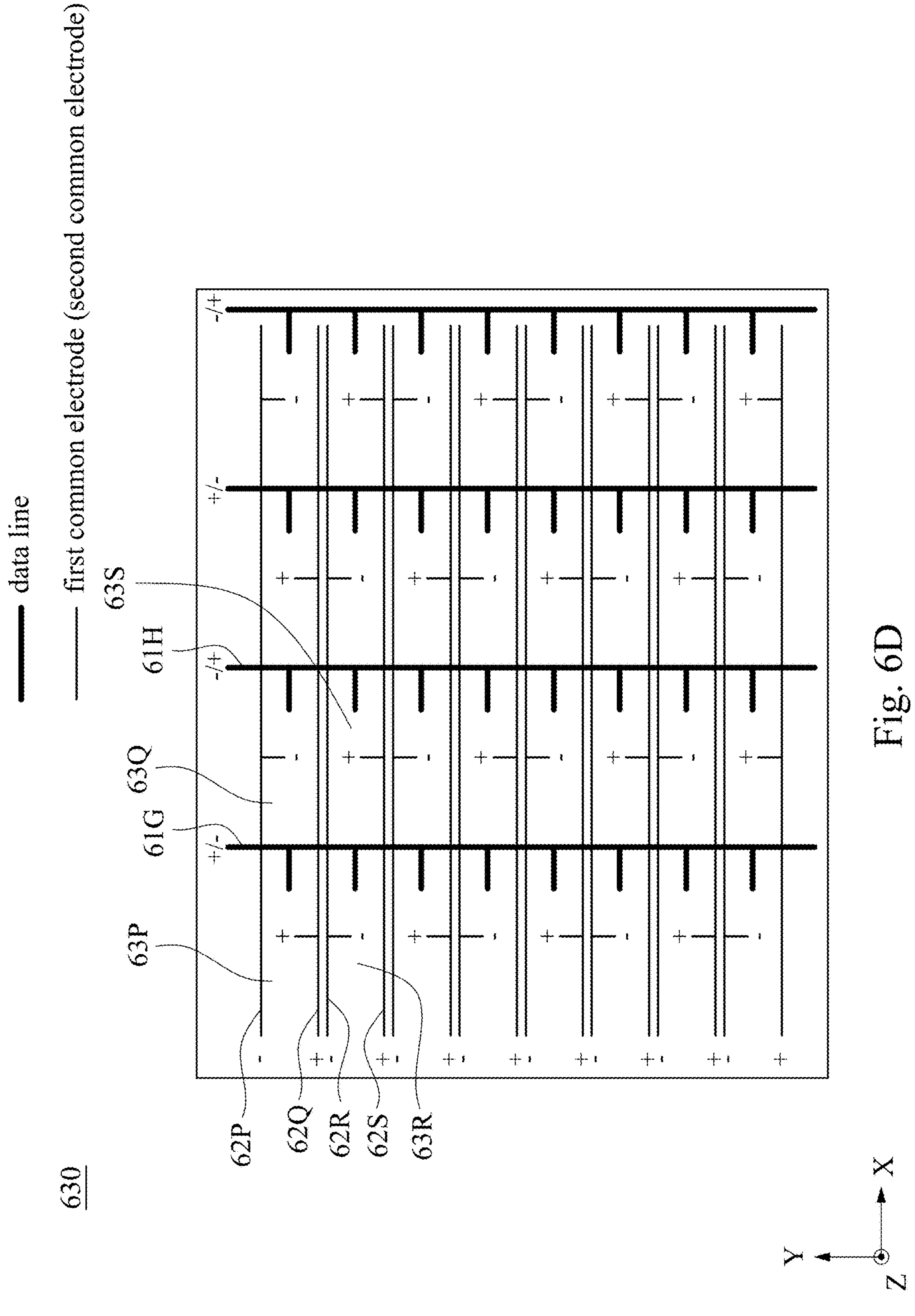
FIG. 6D depicts a usage scenario diagram of a panel driving device according to one embodiment of the present disclosure.

FIG. 6D depicts a usage scenario diagram of a panel driving device according to one embodiment of the present disclosure. As shown in FIG. 6D, in some embodiments, the panel 630 includes a plurality of data lines 61G and 61H, a plurality of reference electrode lines 62P, 62Q, 62R and 62S and a plurality of pixels 63P, 63Q, 63R and 63S.

In connection relationship, the data line 61G is coupled to the pixel 63P, the data line 61G is coupled to the pixel 63R, the data line 61H is coupled to the pixel 63Q, the data line 61H is coupled to the pixel 63S, the reference electrode line 62P is coupled to the pixel 63Q, the reference electrode line 62Q is coupled to the pixel 63P, the reference electrode line 62R is coupled to the pixel 63R, and the reference electrode line 62S is coupled to the pixel 63S.

For example, the data line 61G can be configured to transmit a data signal with a plurality of polarities (e.g.: +/−), the data line 61H can be configured to transmit a data signal with a plurality of polarities (e.g.: −/+), the reference electrode line 62P can be configured to transmit a reference signal with the second polarity, the reference electrode line 62Q can be configured to transmit a reference signal with the first polarity, the reference electrode line 62R can be configured to transmit a reference signal with the second polarity, and the reference electrode line 62S can be configured to transmit a reference signal with the first polarity. The first polarity and the second polarity are different polarities, for example, the first polarity can be positive polarity (+), and the second polarity can be negative polarity (−). However, the present disclosure is not limited to this embodiment.

In some embodiments, each of the plurality of reference electrode line 62P-62S can be the first common electrode or the second common electrode, but the present disclosure is not limited to this embodiment.

In one embodiment, the second pixel 63Q along the first direction is disposed on one side of the first pixel 63P. The third pixel 63R along the second direction is disposed on another side of the first pixel 63P. The fourth pixel 63S along the first direction is disposed on one side of the third pixel 63R, and the fourth pixel 63S is located on one side of the second pixel 63Q.

In one embodiment, in operation, during the positive frame period, the first pixel 63P includes the first polarity, the second pixel 63Q includes the second polarity, the third pixel 63R includes the second polarity, and the fourth pixel 63S includes the first polarity.

Then, during the negative frame period, the first pixel 63P includes the second polarity, the second pixel 63Q includes the first polarity, the third pixel 63R includes the first polarity, and the fourth pixel 63S includes the second polarity.

Furthermore, the first polarity and the second polarity are different from each other, and the first polarity is related to the reference signal.

For example, the positive frame period in FIG. 6D can correspond to the positive frame period P2 in FIG. 5A, the negative frame period in FIG. 6D can correspond to the negative frame period P4 in FIG. 5A, the first polarity can be positive polarity (+), the second polarity can be negative polarity (−), the first polarity of the first pixel 63P can come from the data signal transmitted by the data line 61G, and the second polarity of the third pixel 63R can come from the data signal transmitted by the data line 61G. However, the present disclosure is not limited to this embodiment.

In one embodiment, the data line 61G is coupled to the third pixel 63R.

In one embodiment, the second polarity is related to the reference signal.

For example, the data signal transmitted by the data line 61G can include the first polarity and the second polarity, and the first polarity and the second polarity can be arranged arbitrarily according to the user's needs or timing. However, the present disclosure is not limited to this embodiment.

In some embodiments, the panel 630 in FIG. 6D can correspond to the panel 300 in FIG. 3, but the present disclosure is not limited to this embodiment.

Figure 7A:
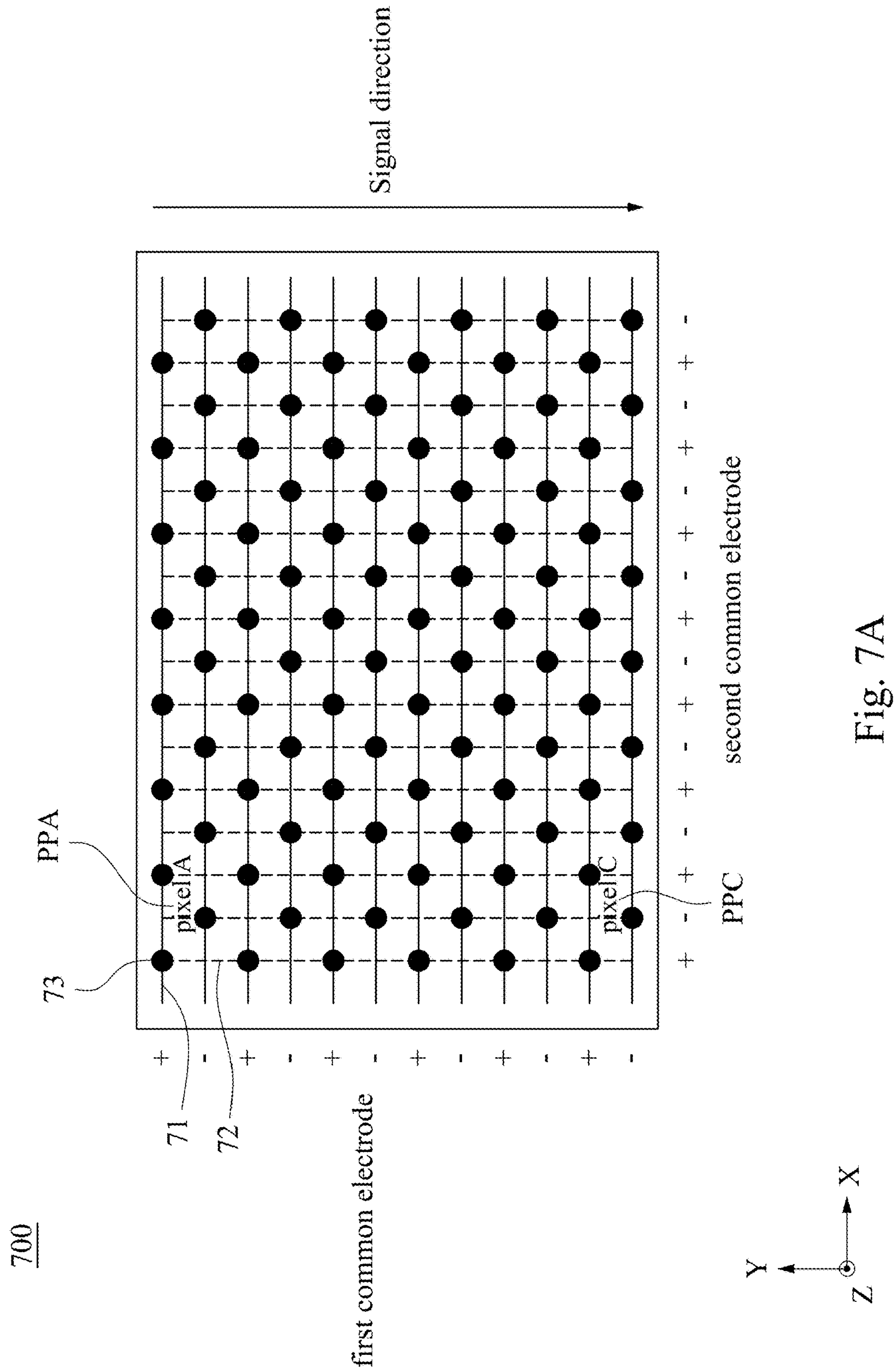
FIG. 7A depicts a schematic structural diagram of a panel driving device according to one embodiment of the present disclosure.

FIG. 7A depicts a schematic structural diagram of a panel driving device according to one embodiment of the present disclosure. As shown in FIG. 7A, in some embodiments, the panel 700 includes a plurality of first reference electrode lines 71, a plurality of second reference electrode lines 72, a plurality of points 73 and a plurality of pixels PPA and PPC.

For example, the first reference electrode lines 71 can be the first common electrode, the second reference electrode lines 72 can be the second common electrode, the points 73 can be intersections of the first reference electrode lines 71 and the second reference electrode lines 72, and the first reference electrode lines 71 and the second reference electrode lines 72 can overlap each other. However, the present disclosure is not limited to this embodiment. In some embodiments, the first common electrode cam be metal common electrode (metal com), and the second common electrode can be an Indium tin oxide common electrode (ITO com). However, the present disclosure is not limited to this embodiment.

Figure 7B:
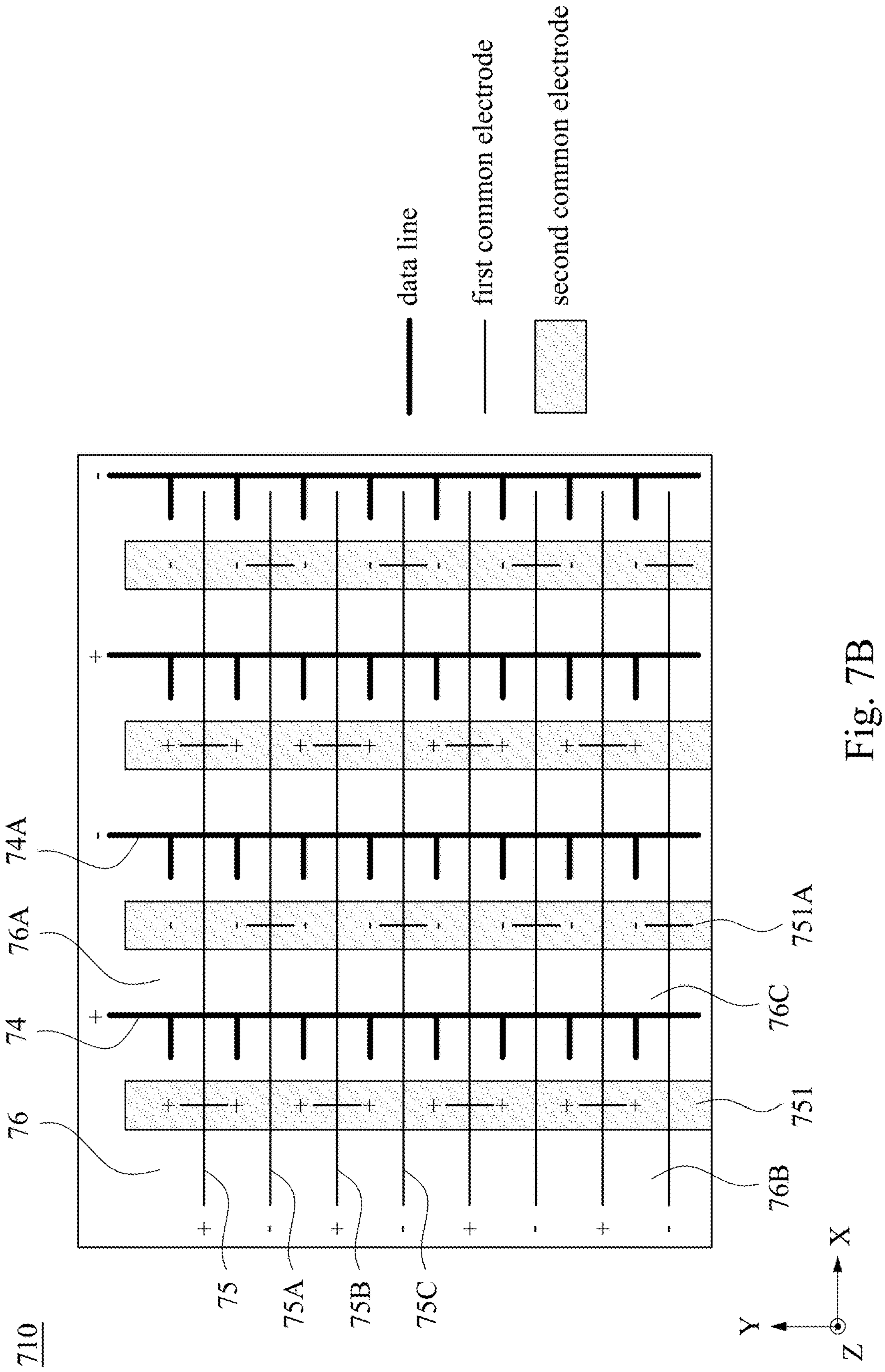
FIG. 7B depicts a schematic structural diagram of a panel driving device according to one embodiment of the present disclosure.

FIG. 7B depicts a schematic structural diagram of a panel driving device according to one embodiment of the present disclosure. As shown in FIG. 7B, in some embodiments, the panel 710 includes a plurality of data lines 74 and 74A, a plurality of first reference electrode lines 75, 75A, 75B and 75C, a plurality of second reference electrode lines 751 and 751A and a plurality of pixels 76, 76A, 76B and 76C.

For example, the plurality of first reference electrode lines 75, 75A, 75B and 75C can be the first common electrode, the plurality of second reference electrode lines 751 and 751A can be the second common electrode, the second reference electrode line 751 can be coupled and overlapped with the plurality of first reference electrode lines 75 and 75B, and the second reference electrode lines 751A can be coupled and overlapped with the plurality of first reference electrode lines 75A and 75C. However, the present disclosure is not limited to this embodiment.

In some embodiments, the panel 710 in FIG. 7B can correspond to the panel 700 in FIG. 7A, the plurality of first reference electrode lines 75,75A,75B and 75C in FIG. 7B can correspond to the plurality of first reference electrode lines 71 in FIG. 7A, the plurality of second reference electrode lines 751 and 751A in FIG. 7B can correspond to the plurality of second reference electrode lines 72 in FIG. 7A, the plurality of pixels 76 and 76A in FIG. 7B can correspond to the plurality of pixels PPA in FIG. 7A, and the plurality of pixels 76B and 76C in FIG. 7B can correspond to the plurality of pixels PPC in FIG. 7A. However, the present disclosure is not limited to this embodiment.

Figure 7C:
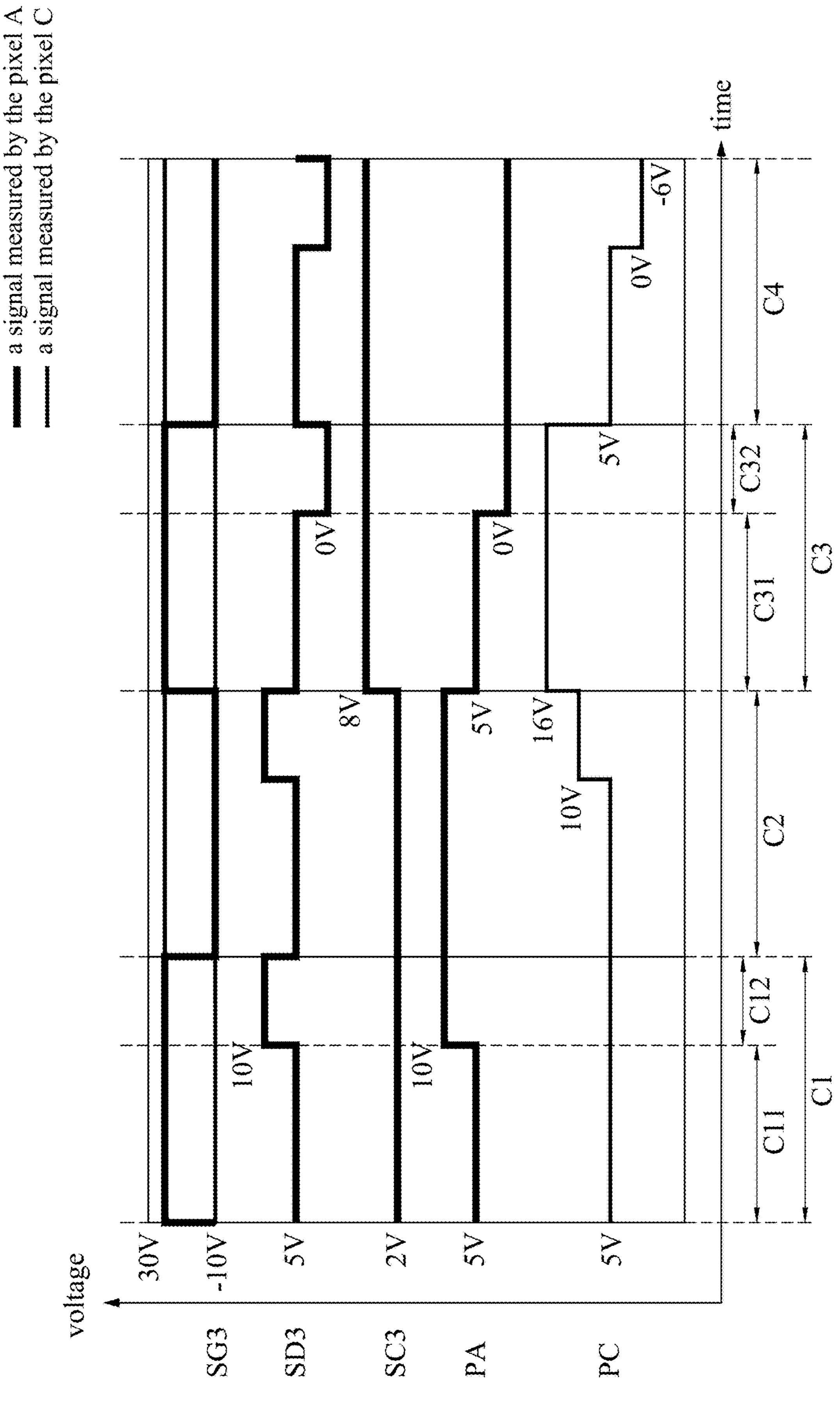
FIG. 7C depicts a timing diagram of a plurality of signals of a panel driving device according to one embodiment of the present disclosure.

FIG. 7C depicts a timing diagram of a plurality of signals of a panel driving device according to one embodiment of the present disclosure. As shown in FIG. 7C, in some embodiments, FIG. 7C includes a gate signal SG3, a data signal SD3, a reference signal SC3 and pixel signals PA and PC.

For example, the gate signal SG3 in FIG. 7C can correspond to the gate signal SG in FIG. 1B, the data signal SD3 in FIG. 7C can correspond to the data signal SD in FIG. 1B, the reference signal SC3 in FIG. 7C can correspond to the reference signal SC in FIG. 1B, and each of the pixel signals PA and PC in FIG. 7C can correspond to the pixel signal measured buy the node U13 in FIG. 1B. However, the present disclosure is not limited to this embodiment.

In some embodiments, the pixel signal PA in FIG. 7C can correspond to the pixel signal measured by the pixel PPA in FIG. 7A, the pixel signal PC in FIG. 7C can correspond to the pixel signal measured by the pixel PPC in FIG. 7A, the data line 74 in FIG. 7B can be configured to transmit the data signal SD3 in FIG. 7C, the first reference electrode lines 75 and 75B in FIG. 7B and the second reference electrode line 751 can be configured to transmit the reference signal SC3 in FIG. 7C. However, the present disclosure is not limited to this embodiment.

In some embodiments, the gate signal SG3 includes a high voltage value and a low voltage value.

For example, the high voltage value of the gate signal SG3 can be 30 f volts, and the low voltage value of the gate signal SG3 can be −10 volts. The high voltage value can be configured to conduct the element U11 (as shown in FIG. 1B), and the low voltage value can be configured to turn off the element U11. However, the present disclosure is not limited to this embodiment.

Please refer to FIG. 1, FIG. 7B and FIG. 7C together, in one embodiment, the panel driving device 100 includes a panel 710. The panel 710 includes a data line 74, a plurality of first reference electrode lines 75 and 75B, a second reference electrode line 751 and a first pixel 76.

In one embodiment, in operation, the data line 74 is configured to transmit the data signal SD3.

Then, the plurality of first reference electrode lines 75 and 75B are configured to transmit the reference signal SC3.

Furthermore, the second reference electrode line 751 are overlapping and coupled to each of the plurality of first reference electrode lines 75 and 75B.

Then, the first pixel 76 is configured to receive the data signal SD3 and the reference signal SC3.

Furthermore, the first pixel is configured to generate the pixel signal PA according to the data signal SD3 and the reference signal SC3.

Then, during the positive frame period C2, a difference between the first voltage value of the pixel signal PA and the first reference voltage value of the reference signal SC3 is a first driving voltage value.

For example, the first voltage value of the pixel signal PA can be 10 volts, the first reference voltage value of the reference signal SC3 can be 2 volts, and the first driving voltage value can be 10−2=8 volts. However, the present disclosure is not limited to this embodiment.

Furthermore, during the negative frame period C4, a difference between the second voltage value the pixel signal PA and the second reference voltage value of the reference signal SC3 is a second driving voltage value.

For example, the second voltage value of the pixel signal PA can be 0 volts, the second reference voltage value of the reference signal SC3 can be 8 volts, and the second driving voltage value can be 8−0=8 volts. However, the present disclosure is not limited to this embodiment.

In one embodiment, the negative frame period C4 is located after the positive frame period C2, and an absolute value of the first driving voltage value is about the same as an absolute value of the second driving voltage value.

For example, the negative frame period C4 can be any period after the positive frame period C2, the absolute value of the first driving voltage value can be 8 volts, and the absolute value of the second driving voltage value can be 8 volts. However, the present disclosure is not limited to this embodiment.

In one embodiment, during a charging period C3 which is between the negative frame period C4 and the positive frame period C2, the pixel signal PA includes a third voltage value which is greater than the second voltage value and is less than or equal to the first voltage value.

For example, the charging period C3 can be any period between the negative frame period C4 and the positive frame period C2, the pixel signal PA can include the third voltage value, and the third voltage value can be 5 volts. However, the present disclosure is not limited to this embodiment.

In one embodiment, during the first period C11, the data signa ISD3 includes the first data voltage value, the reference signal SC3 includes the first reference voltage value, and the pixel signal PA includes the initial voltage value. The first period C11 is located before the positive frame period C2.

For example, the first data voltage value of the data signal SD3 can be 5 volts, the first reference voltage value of the reference signal SC3 can be 2 volts, and the initial voltage value pixel signal PA can be 5 volts. However, the present disclosure is not limited to this embodiment.

In one embodiment, during the second period C12, the data signal SD3 includes the second data voltage value, the reference signal SC3 is maintained at the first reference voltage value, and the initial voltage value of the pixel signal PA is increased to the first voltage value according to the second data voltage value. The second data voltage value is greater than the first data voltage value, and the second period C12 is located after the first period C11.

For example, the second data voltage value of the data signal SD3 can be 10 volts, the first reference voltage value of the reference signal SC3 can be 2 volts, and the first voltage value of the pixel signal PA can be 10 volts. However, the present disclosure is not limited to this embodiment.

In one embodiment, during the third period C31, the data signal SD3 includes the first data voltage value, the reference signal SC3 includes the second reference voltage value, the pixel signal PA includes the fifth voltage value. The second reference voltage value is greater than the first reference voltage value, and the third period C31 is located after the positive frame period C2.

For example, the first data voltage value of the data signal SD3 can be 5 volts, the second reference voltage value of the reference signal SC3 can be 8 volts, the fifth voltage value of the pixel signal PA can be 5 volts. However, the present disclosure is not limited to this embodiment.

In one embodiment, during the fourth period C32, the data signal SD3 includes the third data voltage value, the reference signal SC3 is maintained at the second reference voltage value, and the fifth voltage value of the pixel signal PA is reduced to the second voltage value according to the third data voltage value. The third data voltage value is less than or equal to the first data voltage, and the fourth period C32 is located after the third period C31.

For example, the third data voltage value of the data signal SD3 can be 0 volts, the second reference voltage value of the reference signal SC3 can be 8 volts, and the second voltage value of the pixel signal PA can be 0 volts. However, the present disclosure is not limited to this embodiment.

In some embodiments, the gate signal SG3 can include n-level gate signal and n+1-level gate signal, the data signal SD3 can include n-level data signal and n+1-level data signal, the reference signal SC3 can include n-level reference signal and n+1-level reference signal, and the pixel signal can include n-level pixel signal PA and n+1-level pixel signal PC. However, the present disclosure is not limited to this embodiment.

For example, n-level signals and n+1-level signals in FIG. 7C are similar in operation, and a difference is only in timing and signal size. However, the present disclosure is not limited to this embodiment.

Please refer to FIG. 7A and FIG. 7C, in some embodiments, the pixel signal PA in FIG. 7C can be the pixel signal measured by the pixel PPA (i.e.: the pixel A) in FIG. 7A, and the pixel signal PC in FIG. 7C can be the pixel signal measured by the pixel PPC (i.e.: the pixel C) in FIG. 7A. However, the present disclosure is not limited to this embodiment.

In some embodiments, the pixel PPA (i.e.: the pixel A) in FIG. 7A can be configured to receive (or include) the gate signal SG3, the data signal SD3, the reference signal SC3 and/or the pixel signal PA in FIG. 7C.

In some embodiments, the pixel PPC (i.e.: the pixel C) in FIG. 7A can be configured to receive (or include) the gate signal SG3, the data signal SD3, the reference signal SC3 and/or the pixel signal PC in FIG. 7C.

Figure 8:
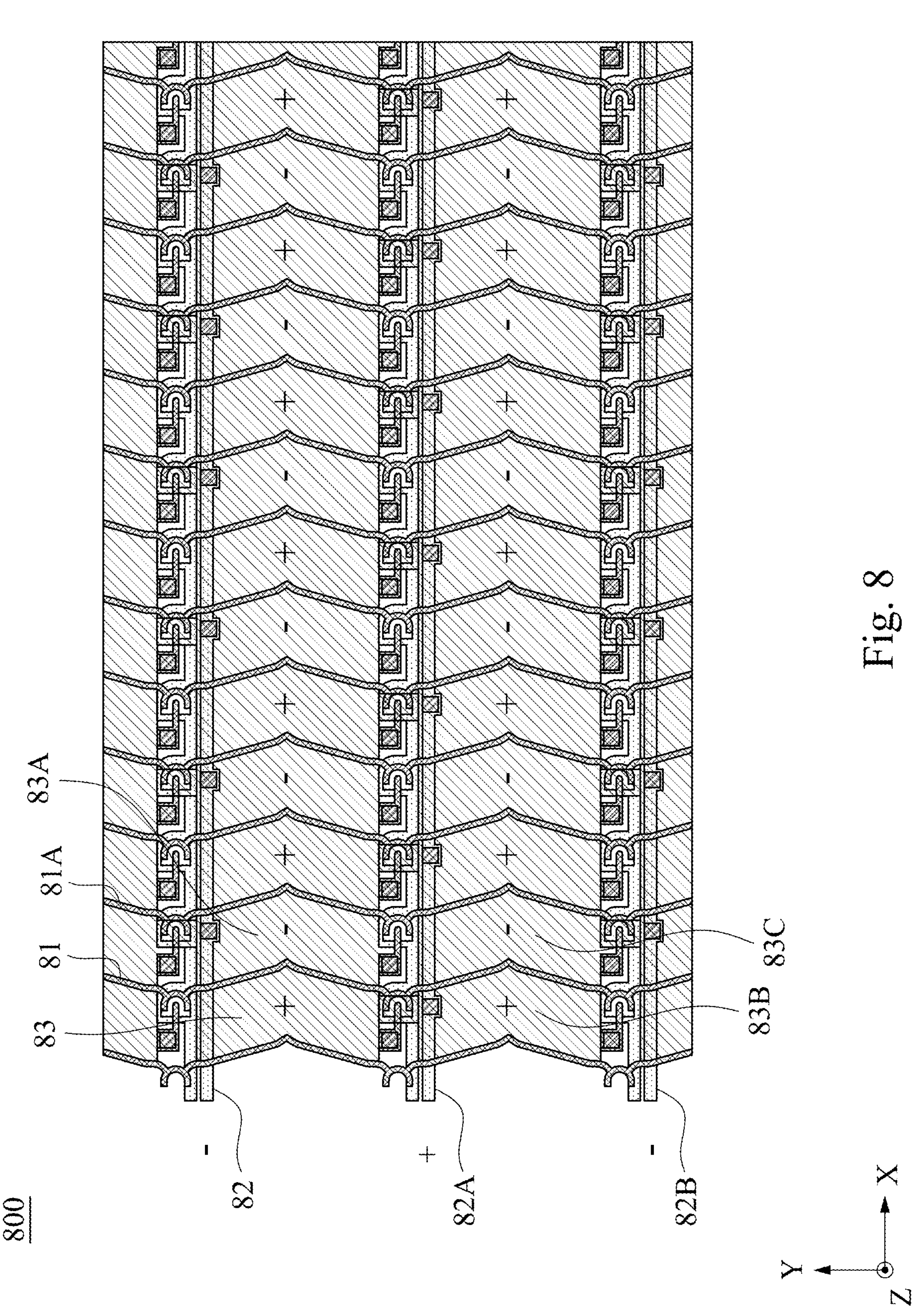
FIG. 8 depicts a schematic structural diagram of a panel driving device according to one embodiment of the present disclosure.

FIG. 8 depicts a schematic structural diagram of a panel driving device according to one embodiment of the present disclosure. As shown in FIG. 8, in some embodiments, the panel 800 includes a plurality of data lines 81 and 81A, a plurality of reference electrode lines 82, 82A and 82B and a plurality of pixels 83, 83A, 83B and 82C.

For example, the data line 81 is configured to transmit the data signal to the pixel 83, the data line 81A is configured to transmit the data signal to the pixel 83A, the reference electrode line 82A is configured to transmit the reference signal with the first polarity to the pixel 83 and 83B, the reference electrode line 82 is configured to transmit the reference signal with the second polarity to the pixe 183A, the reference electrode line 82B is configured to the reference signal with the second polarity to the pixel 83C. However, the present disclosure is not limited to this embodiment.

In some embodiments, during the positive frame period, "+" in FIG. 8 can be regarded as positive polarity, and "−" can be regarded as negative polarity. During the negative frame period, the polarities of "+" and "−" in FIG. 8 are reversed, but the present disclosure is not limited to this embodiment.

In some embodiments, the panel 800 in FIG. 8 corresponds to the panel 110 in FIG. 1A, one of the plurality of data lines 81 and 81A in FIG. 8 corresponds to the data line 111 in FIG. 1A, one of the plurality of reference electrode lines 82, 82A, and 82B in FIG. 8 corresponds to the reference electrode line 112 in FIG. 1A, and one of the plurality of pixels 83, 83A, 83B and 82C in FIG. 8 corresponds to the pixel 113 in FIG. 1A. However, the present disclosure is not limited to this embodiment.

In some embodiments, a design of the panel 800 in FIG. 8 can be another design aspect of the panel 300 in FIG. 3, but the present disclosure is not limited to this embodiment.

Figure 9A:
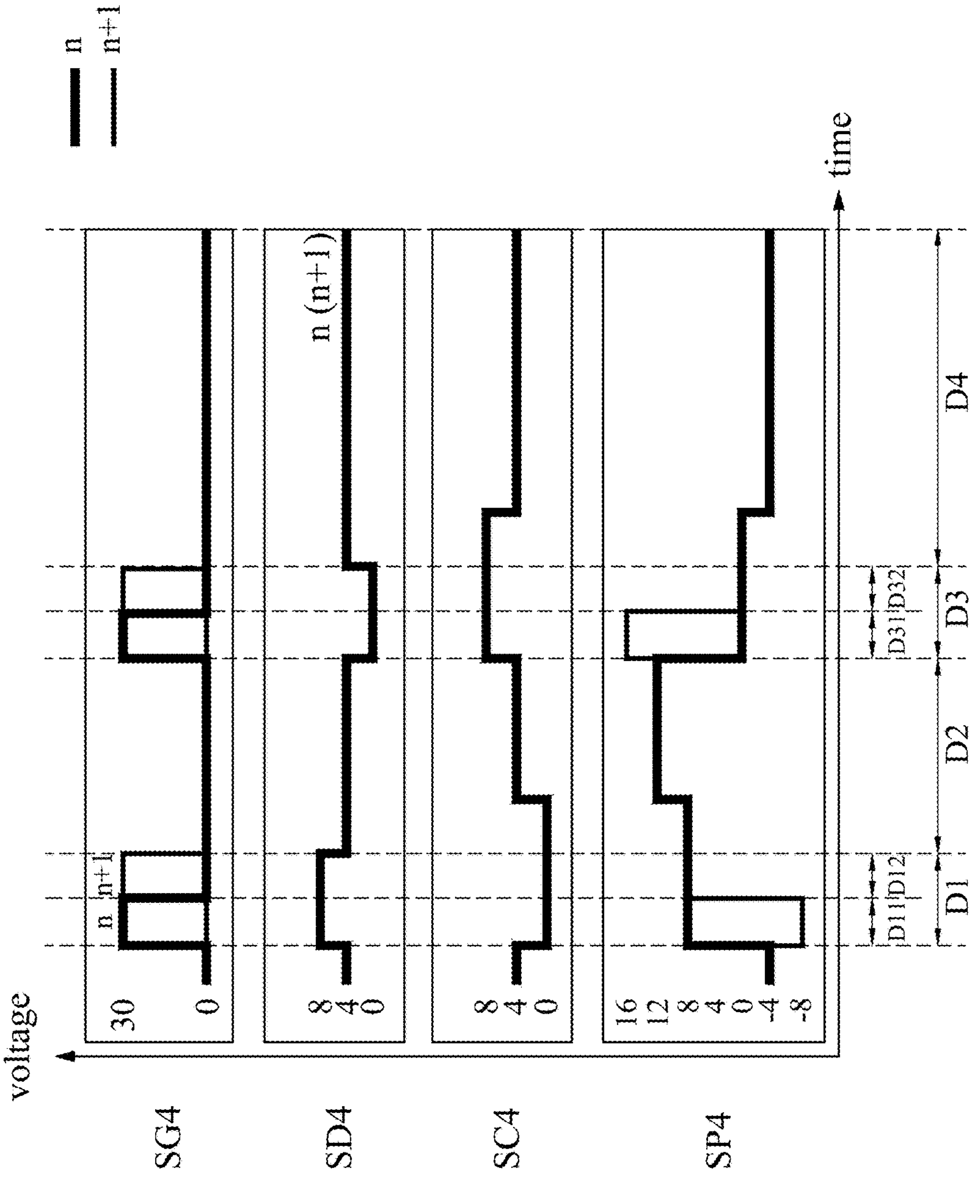
FIG. 9A depicts a timing diagram of a plurality of signals of a panel driving device according to one embodiment of the present disclosure.

FIG. 9A depicts a timing diagram of a plurality of signals of a panel driving device according to one embodiment of the present disclosure. As shown in FIG. 9A, in some embodiments, FIG. 9A includes a gate signal SG4, a data signal SD4, a reference signal SC4 and a pixel signal SP4.

For example, the gate signal SG4 in FIG. 9A can correspond to the gate signal SG in FIG. 1B, the data signal SD4 in FIG. 9A can correspond to the data signal SD in FIG. 1B, the reference signal SC4 in FIG. 9A can correspond to the reference signal SC in FIG. 1B, and the pixel signal SP4 in FIG. 9A can correspond to the pixel signal measured by the node U13 in FIG. 1B. However, the present disclosure is not limited to this embodiment.

In some embodiments, the gate signal SG4 includes a high voltage value and a low voltage value.

For example, the high voltage value of the gate signal SG4 can be 30 volts, and the low voltage value of the gate signal SG1 can be 0 volts. The high voltage value can be configured to conduct the element U11 (as shown in FIG. 1B), and the low voltage value can be configured to turn off the element U11. However, the present disclosure is not limited to this embodiment.

In some embodiments, operations of FIG. 9A are similar to operations of FIG. 5A. For the sake of simplicity, descriptions will be omitted here. It should be noted that a timing and/or a voltage value of the the data signal SD4, the reference signal SC4 and/or the pixel signal SP4 in FIG. 9A can be adjusted according to user needs. However, the present disclosure is not limited to this embodiment.

Please refer to FIG. 8 and FIG. 9A, the data line 81 can be configured to transmit the data signal SD4 to the pixel 83, the reference electrode line 82A can be configured to the reference signal SC4 to the pixels 83 and 83B, and the pixel 83 can include the pixel signal SP4. However, the present disclosure is not limited to this embodiment.

In some embodiments, a time point when the voltage value of the reference signal SC4 drops from 4 volts to 0 volts can be from a beginning of the positive frame (+frame) to before the charging of the pixel 83 is completed (generally recommended before the gate is conducted). At this time, it can be regarded as the reference electrode line (or called common electrode, Com) switching to the reference voltage with the positive polarity (Vcom+). However, the present disclosure is not limited to this embodiment.

In some embodiments, a time point when the voltage value of the reference signal SC4 rises from 0 volts to 4 volts can be after the pixel 83B is charged. At this time, it can be regarded as the reference electrode line (or called common electrode, Com) switching to a stable reference voltage (Vcom-stable). However, the present disclosure is not limited to this embodiment.

In some embodiments, a time point when the voltage value of the reference signal SC4 rises from 4 volts to 8 volts can be a beginning of the negative frame (−frame) to before the charging of the pixel 83 is completed (generally recommended before the gate is conducted). it can be regarded as the reference electrode line (or called common electrode, Com) switching to the reference voltage with negative polarity (Vcom−. However, the present disclosure is not limited to this embodiment.

In some embodiments, a time point when the voltage value of the reference signal SC4 drops from 8 volts to 4 volts can be after the pixel 83B is charged. At this time, it can be regarded as reference electrode line (or common electrode, Com) switching to a stable reference voltage (Vcom-stable). However, the present disclosure is not limited to this embodiment.

In some embodiments, the voltage value of the pixel signal SP4 rising from −4 volts to 8 volts means that after the gate is conducted, the pixel 83 is charged by the data signal SD4. However, the present disclosure is not limited to this embodiment.

In some embodiments, the voltage value of the pixel signal SP4 maintaining at 8 volts means that after the gata is turned off, the pixel 83 is configured to maintain the pixel signal SP4 (or called holding). However, the present disclosure is not limited to this embodiment.

In some embodiments, the voltage value of the pixel signal SP4 rising from 8 volts to 12 volts means that after the reference electrode line (or called common electrode, Com) is switching to the stable reference voltage (Vcom-stable), a result of the pixel signal SP4 being coupled by the reference voltage. However, the present disclosure is not limited to this embodiment.

Figure 9B:
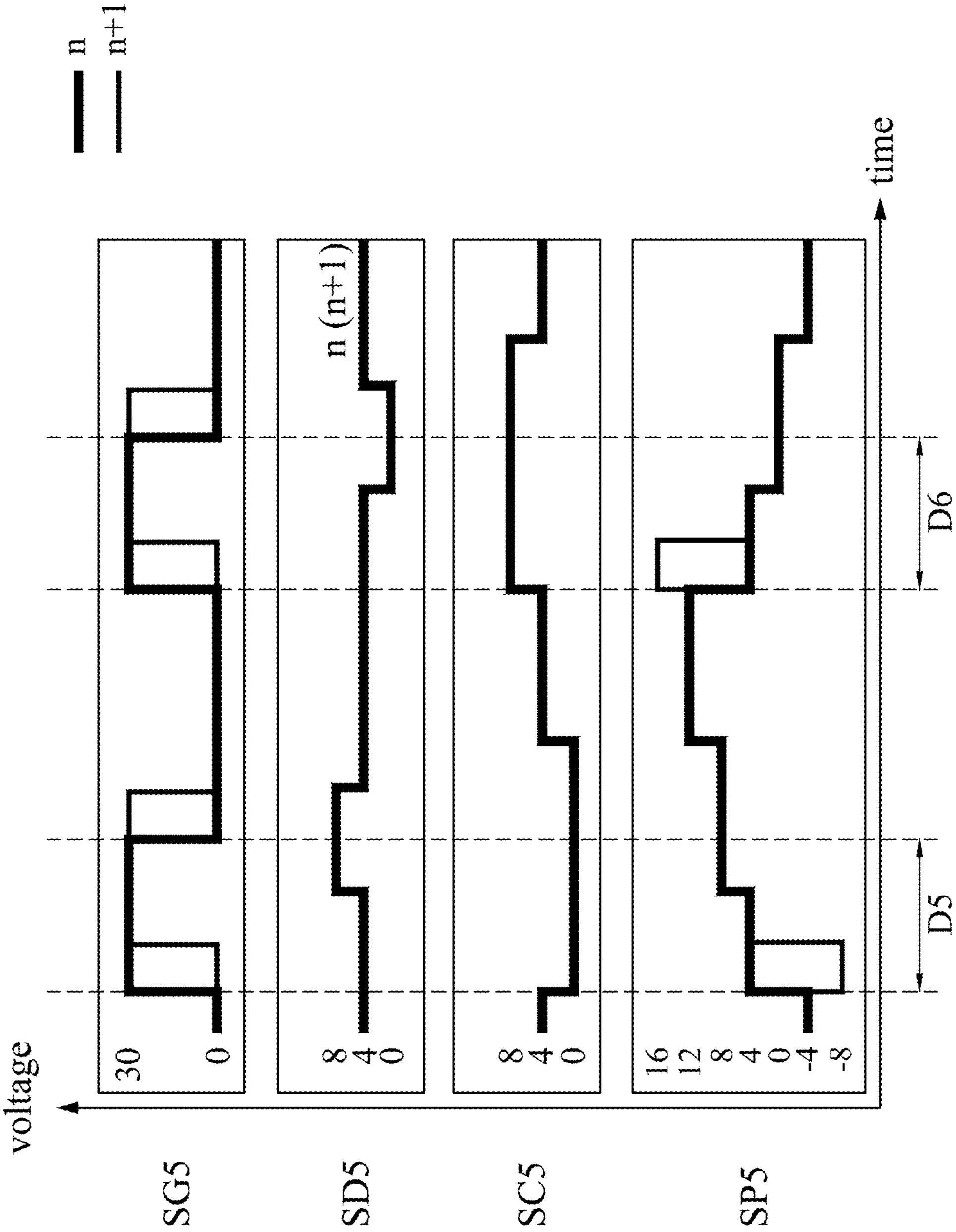
FIG. 9B depicts a timing diagram of a plurality of signals of a panel driving device according to one embodiment of the present disclosure.

FIG. 9B depicts a timing diagram of a plurality of signals of a panel driving device according to one embodiment of the present disclosure. As shown in FIG. 9B, in some embodiments, FIG. 9B includes a gate signal SG5, a data signal SD5, a reference signal SC5 and a pixel signal SP5.

In some embodiments, operations of FIG. 9B are similar to operations of 9A For the sake of simplicity, descriptions will be omitted here. It should be noted that a timing and/or a voltage value of the data signal SD5, the reference signal SC5 and/or the pixel signal SP5 in FIG. 9B can be adjusted according to user needs. However, the present disclosure is not limited to this embodiment.

In some embodiments, FIG. 9B can be another implementation of FIG. 9A. FIG. 9A can be a normal driving, and FIG. 9B can be a pre-charging driving. However, the present disclosure is not limited to this embodiment.

In some embodiments, the gate signal SG5 includes two pulse signals, and the two pulse signals include two pulse times D5 and D6.

For example, the pulse time D5 can be approximately equal to the pulse time D6, the pulse time D5 can be greater than a pulse time D11 of the gate signal SG4 in FIG. 9A, and the pulse time D6 can be greater than a pulse time D31 of the gate signal SG4 in FIG. 9A. However, the present disclosure is not limited to this embodiment.

Figure 10A:
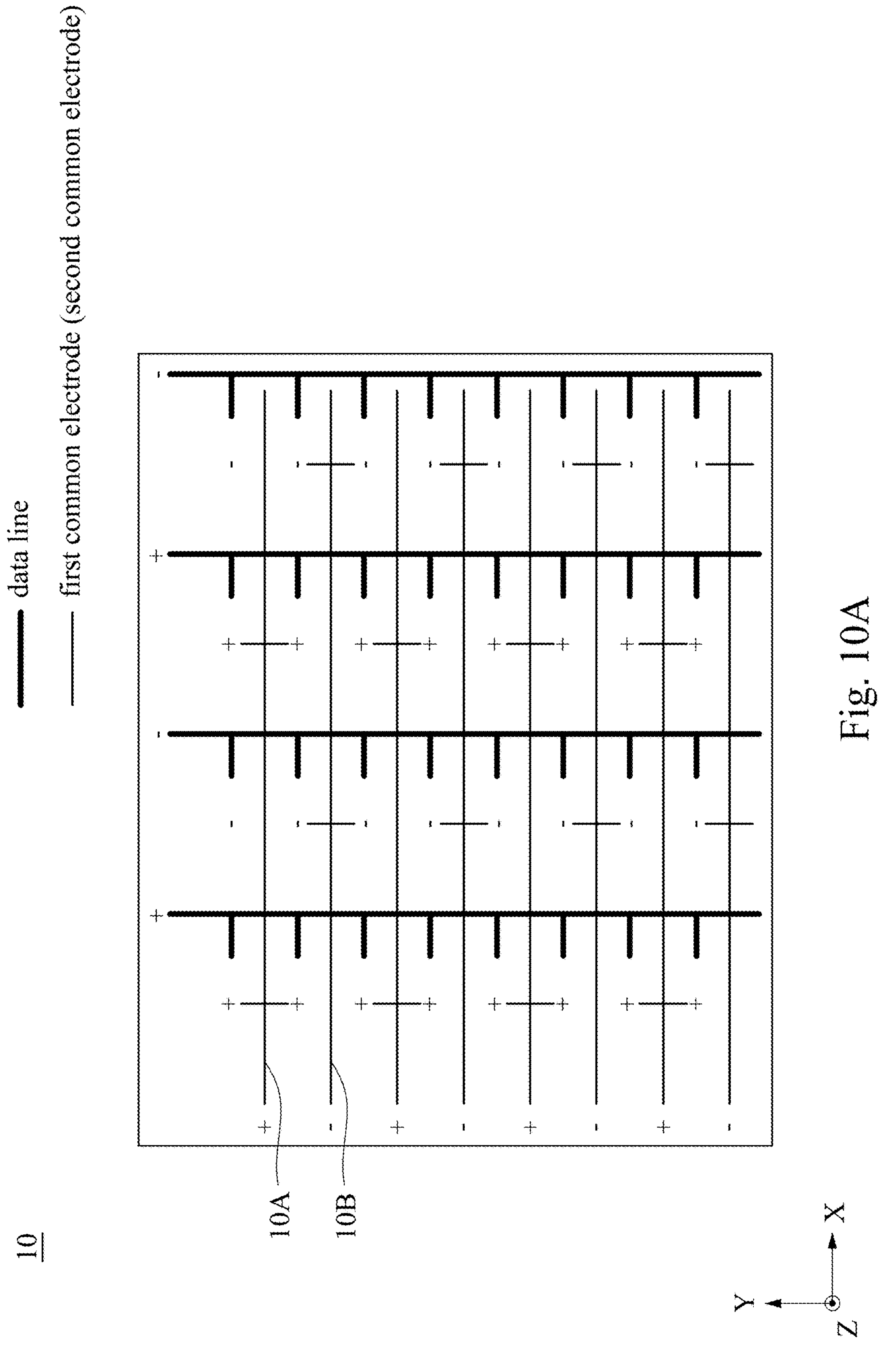
FIG. 10A depicts a usage scenario diagram of a panel driving device according to one embodiment of the present disclosure.

FIG. 10A depicts a usage scenario diagram of a panel driving device according to one embodiment of the present disclosure. As shown in FIG. 10A, in some embodiments, FIG. 10A includes a panel 10, and the panel 10 includes a plurality of reference electrode lines 10A and 10B.

For example, operations and structures of the panel 10 in FIG. 10A are similar to operations and structures in FIG. 6A. For the sake of simplicity, descriptions will be omitted here. It should be noted that a total number of the plurality of reference electrode lines 10A and 10B in FIG. 10A is less than a total number of the plurality of reference electrode lines 62,62A and 62B in FIG. 6A. However, the present disclosure is not limited to this embodiment.

Figure 10B:
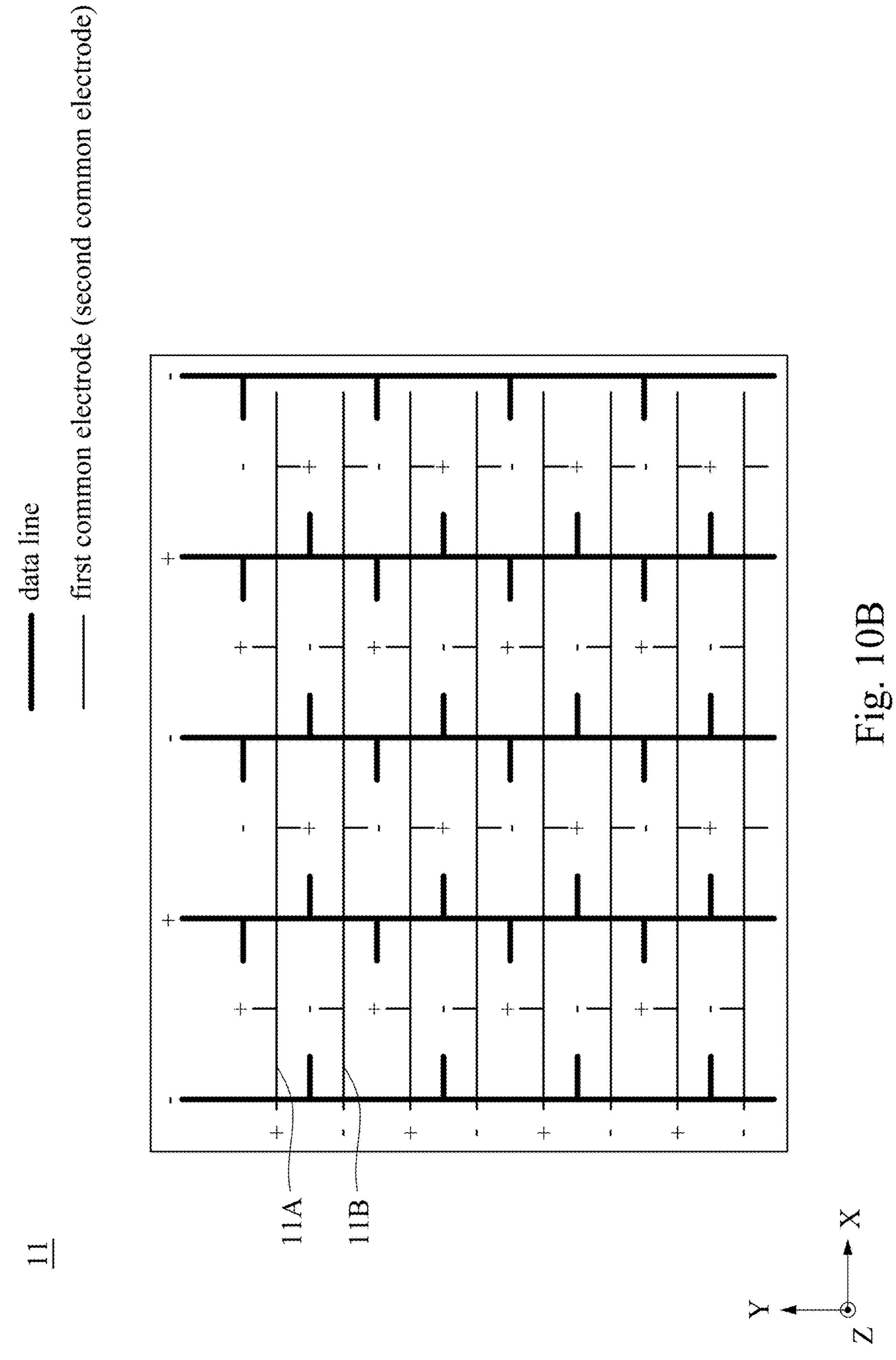
FIG. 10B depicts a usage scenario diagram of a panel driving device according to one embodiment of the present disclosure.

FIG. 10B depicts a usage scenario diagram of a panel driving device according to one embodiment of the present disclosure. As shown in FIG. 10B, in some embodiments, FIG. 10B includes a panel 11, and the panel 11 includes a plurality of reference electrode lines 11A and 11B.

For example, operations and structures of the panel 11 in FIG. 10B are similar to operations and structures in FIG. 6B. For the sake of simplicity, descriptions will be omitted here. It should be noted that a total number of the plurality of reference electrode lines 11A and 11B in FIG. 10B is less than a total number of the plurality of reference electrode lines 62D-62G in FIG. 6B. However, the present disclosure is not limited to this embodiment.

Figure 10C:
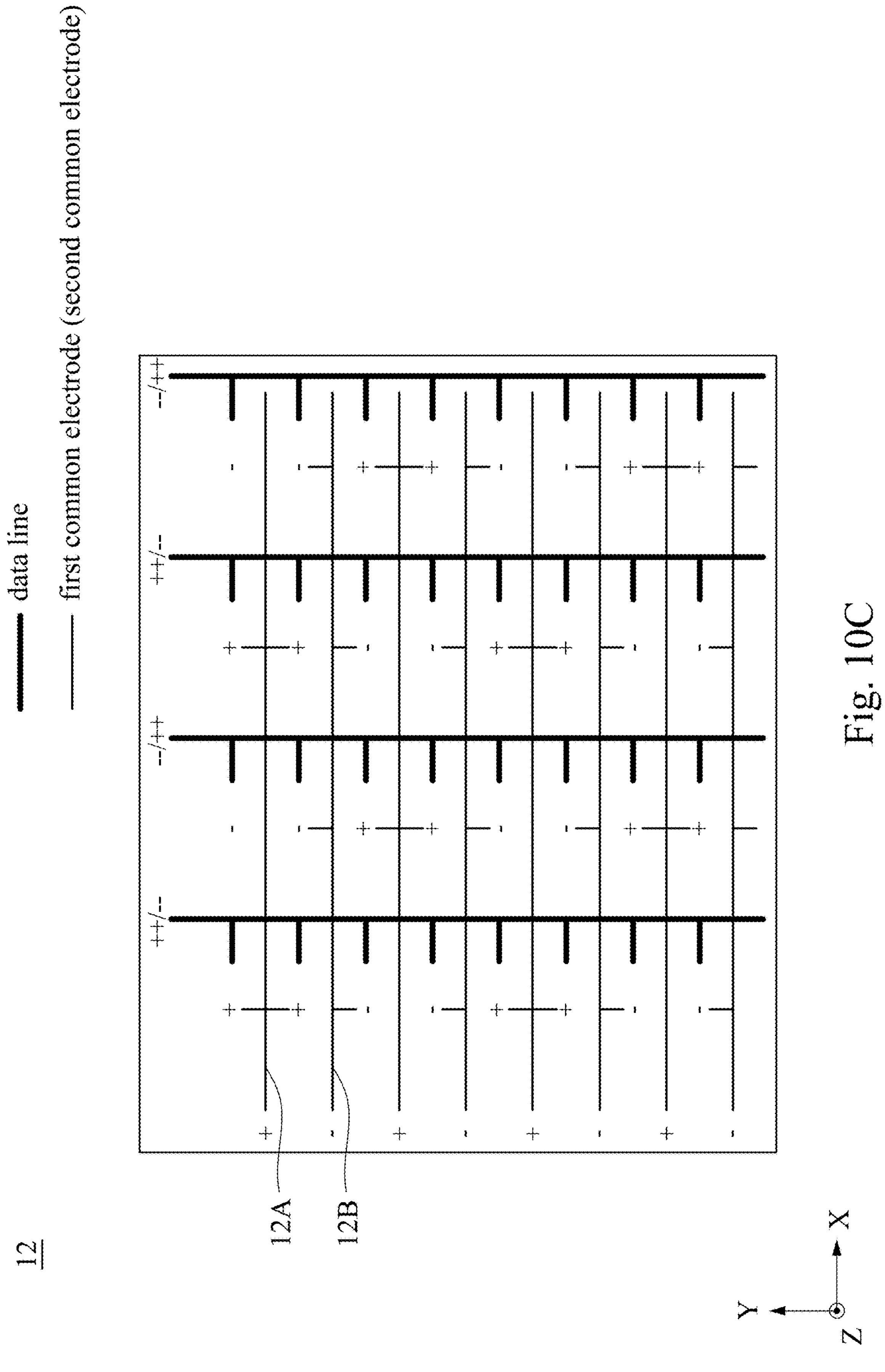
FIG. 10C depicts a usage scenario diagram of a panel driving device according to one embodiment of the present disclosure.

FIG. 10C depicts a usage scenario diagram of a panel driving device according to one embodiment of the present disclosure. As shown in FIG. 10C, in some embodiments, FIG. 10C includes a panel 12, and the panel 12 includes a plurality of reference electrode lines 12A and 12B.

For example, operations and structures of the panel 12 in FIG. 10C are similar to operations and structures in FIG. 6C. For the sake of simplicity, descriptions will be omitted here. It should be noted that a total number of the plurality of reference electrode lines 12A and 12B in FIG. 10C is less than a total number of the plurality of reference electrode lines 62H-62O in FIG. 6C. However, the present disclosure is not limited to this embodiment.

Figure 10D:
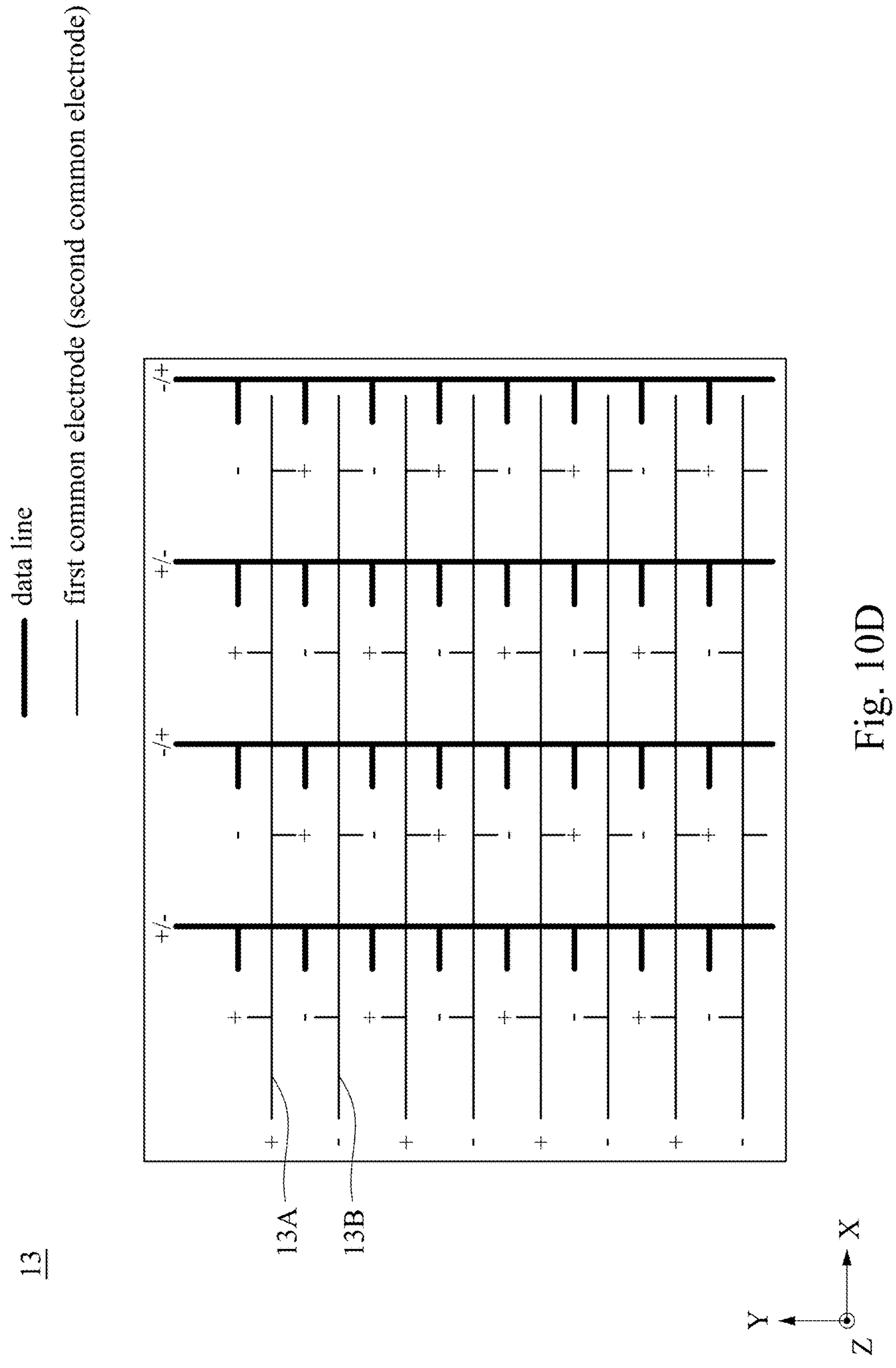
FIG. 10D depicts a usage scenario diagram of a panel driving device according to one embodiment of the present disclosure.

FIG. 10D depicts a usage scenario diagram of a panel driving device according to one embodiment of the present disclosure. As shown in FIG. 10D, in some embodiments, FIG. 10D includes a panel 13, and the panel 13 includes a plurality of reference electrode lines 13A and 13B.

For example, operations and structures of the panel 13 in FIG. 10D are similar to operations and structures in FIG. 6D. For the sake of simplicity, descriptions will be omitted here. It should be noted that a total number of the plurality of reference electrode lines 13A and 13B in FIG. 10D is less than a total number of the plurality of reference electrode lines 62P-62S in FIG. 6D, but the present disclosure is not limited to this embodiment.

In some embodiments, each of the panel 10 in FIG. 10A, the panel 11 in FIG. 10B, the panel 12 in FIG. 10C and the panel 13 in FIG. 10D can correspond to the panel 800 in FIG. 8, but the present disclosure is not limited to this embodiment.

In some embodiments, an aperture ratio of a panel of each of the panel 10 in FIG. 10A, the panel 11 in FIG. 10B, the panel 12 in FIG. 10C and/or the panel 13 in FIG. 10D is greater than an aperture ratio of a panel of each of the panel 600 in FIG. 6A, the panel 610 in FIG. 6B, the panel 620 in FIG. 6C and/or the panel 630 in FIG. 6D.

For example, in the panel 600 in FIG. 6A, the panel 610 in FIG. 6B, the panel 620 in FIG. 6C or the panel 630 in FIG. 6D, pixels in the same row (or arranged along the first direction) must be equipped with two reference electrode lines (e.g.: metal common electrode). In contrast, pixels of each of the panel 10 in FIG. 10A, the panel 11 in FIG. 10B, the panel 12 in FIG. 10C or the panel 13 in FIG. 10D can be connected to upper and lower rows of pixels by a reference electrode line (e.g.: metal common electrode) to achieve an effect of increasing an aperture ratio of a panel.

Based on the aforementioned embodiments of the present disclosure, the present disclosure includes following advantages. Embodiments of the present disclosure panel driving device can achieve an effect of increasing a driving voltage of a liquid crystal by using the two voltage values of the reference signal.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A panel driving device, comprising:

a panel, comprising:

a data line, configured to transmit a data signal;

a reference electrode line, configured to transmit a reference signal; and a first pixel, configured to receive the data signal and the reference signal;

wherein the first pixel is configured to generate a pixel signal according to the data signal and the reference signal;

wherein during a positive frame period, a difference between a first voltage value of the pixel signal and a first reference voltage value of the reference signal is a first driving voltage value;

wherein during a negative frame period, a difference between a second voltage value of the pixel signal and a second reference voltage value of the reference signal is a second driving voltage value;

wherein the negative frame period is located after the positive frame period, and an absolute value of the first driving voltage value is about the same as an absolute value of the second driving voltage value;

wherein during a charging period which is between the negative frame period and the positive frame period, the pixel signal comprises a third voltage value which is greater than the second voltage value and is less than or equal to the first voltage value;

wherein during a first period, the data signal comprises a first data voltage value, the reference signal comprises a third reference voltage value, an initial voltage value of the pixel signal is increased to a fourth voltage value according to the first data voltage value, wherein the first data voltage value is greater than the third reference voltage value, and the first period is located before the positive frame period.

2. The panel driving device of claim 1, wherein during an initial period before the positive frame period, the pixel signal comprises the fourth voltage value which is greater than the third voltage value and is less than or equal to the first voltage value.

3. The panel driving device of claim 1, wherein during a second period, the data signal comprises a second data voltage value, the reference signal is maintained at the third reference voltage value, and the pixel signal is maintained at the fourth voltage value, wherein the second data voltage value is less than or equal to the first data voltage value, and the second period is located after the first period.

4. The panel driving device of claim 3, wherein during a third period, the data signal comprises a third data voltage value, the reference signal comprises a fourth reference voltage value, the first voltage value of the pixel signal is reduced to a fifth voltage value according to the third data voltage value, wherein the third data voltage value is less than or equal to the second data voltage value, the fourth reference voltage value is greater than the first reference voltage value, and the third period is located after the positive frame period.

5. The panel driving device of claim 4, wherein during a fourth period, the data signal comprises a fourth data voltage value, the reference signal is maintained at the fourth reference voltage value, and the pixel signal is maintained at the fifth voltage value, wherein the fourth data voltage value is less than or equal to the third data voltage value, and the fourth period is located after the third period.

6. The panel driving device of claim 5, further comprising:

a second pixel, disposed on one side of the first pixel along a first direction;

a third pixel, disposed on another side of the first pixel along a second direction; and a fourth pixel, disposed on one side of the third pixel along the first direction, wherein the fourth pixel is located at one side of the second pixel;

wherein during the positive frame period, the first pixel comprises a first polarity, the second pixel comprises a second polarity, the third pixel comprises the first polarity, and the fourth pixel comprises the second polarity;

wherein during the negative frame period, the first pixel comprises the second polarity, the second pixel comprises the first polarity, the third pixel comprises the second polarity, and the fourth pixel comprises the first polarity;

wherein the first polarity and the second polarity are different from each other, and the first polarity is related to the reference signal.

7. The panel driving device of claim 6, wherein the data line is coupled to the third pixel.

8. The panel driving device of claim 6, further comprising:

a fifth pixel, disposed on another side of the third pixel along the second direction;

a sixth pixel, disposed on one side of the fifth pixel along the first direction;

a seventh pixel, disposed on another side of the fifth pixel along the second direction; and an eighth pixel, disposed on one side of the seventh pixel along the first direction, wherein the eighth pixel is located at one side of the sixth pixel;

wherein during the positive frame period, the fifth pixel comprises the second polarity, the sixth pixel comprises the first polarity, the seventh pixel comprises the second polarity, and the eighth pixel comprises the first polarity;

wherein during the negative frame period, the fifth pixel comprises the first polarity, the sixth pixel comprises the second polarity, the seventh pixel comprises the first polarity, and the eighth pixel comprises the second polarity.

9. The panel driving device of claim 8, wherein the data line is coupled to the third pixel, the fifth pixel and the seventh pixel.

10. The panel driving device of claim 5, further comprising:

a second pixel, disposed on one side of the first pixel along a first direction;

a third pixel, disposed on another side of the first pixel along a second direction; and a fourth pixel, disposed on one side of the third pixel along the first direction, wherein the fourth pixel is located at one side of the second pixel;

wherein during the positive frame period, the first pixel comprises a first polarity, the second pixel comprises a second polarity, the third pixel comprises the second polarity, and the fourth pixel comprises the first polarity;

wherein during the negative frame period, the first pixel comprises the second polarity, the second pixel comprises the first polarity, the third pixel comprises the first polarity, and the fourth pixel comprises the second polarity;

wherein the first polarity and the second polarity are different from each other, and the first polarity is related to the reference signal.

11. The panel driving device of claim 10, wherein the data line is coupled to the fourth pixel.

12. The panel driving device of claim 10, wherein the data line is coupled to the third pixel.

13. The panel driving device of claim 12, wherein the second polarity is related to the reference signal.

14. The panel driving device of claim 13, wherein the second polarity is related to the data signal.

15. A panel driving device, comprising:

a panel, comprising:

a data line, configured to transmit a data signal;

a plurality of first reference electrode lines, configured to transmit a reference signal;

a second reference electrode line, overlapping and coupled to each of the first reference electrode lines; and a first pixel, configured to receive the data signal and the reference signal;

wherein the first pixel is configured to generate a pixel signal according to the data signal and the reference signal;

wherein during a positive frame period, a difference between a first voltage value of the pixel signal and a first reference voltage value of the reference signal is a first driving voltage value;

wherein during a negative frame period, a difference between a second voltage value of the pixel signal and a second reference voltage value of the reference signal is a second driving voltage value;

wherein the negative frame period is located after the positive frame period, and an absolute value of the first driving voltage value is about the same as an absolute value of the second driving voltage value;

wherein during a charging period which is between the negative frame period and the positive frame period, the pixel signal comprises a third voltage value which is greater than the second voltage value and is less than or equal to the first voltage value;

wherein during a first period, the data signal comprises a first data voltage value the reference signal comprises the first reference voltage value, and the pixel signal comprises an initial voltage value, wherein the first period is located before the positive frame period;

wherein during a second period, the data signal comprises a second data voltage value, the reference signal is maintained at the first reference voltage value, and the initial voltage value of the pixel signal is increased to the first voltage value according to the second data voltage value, wherein the second data voltage value is greater than the first data voltage value, and the second period is located after the first period.

16. The panel driving device of claim 15, wherein during a third period, the data signal comprises the first data voltage value, the reference signal comprises the second reference voltage value, the pixel signal comprises a fifth voltage value, wherein the second reference voltage value is greater than the first reference voltage value, and the third period is located after the positive frame period.

17. The panel driving device of claim 16, wherein during a fourth period, the data signal comprises a third data voltage value, the reference signal is maintained at the second reference voltage value, and the fifth voltage value of the pixel signal is reduced to the second voltage value according to the third data voltage value, wherein the third data voltage value is less than or equal to the first data voltage value, and the fourth period is located after the third period.

* * * * *